United States Patent
Sasaki et al.

(10) Patent No.: US 7,894,697 B2
(45) Date of Patent: Feb. 22, 2011

(54) OPTICAL FIBER, OPTICAL TRANSMISSION LINE, OPTICAL MODULE, AND OPTICAL TRANSMISSION SYSTEM

(75) Inventors: Takashi Sasaki, Yokohama (JP);
Kazumasa Makihara, Yokohama (JP);
Tetsuya Haruna, Yokohama (JP);
Masashi Onishi, Yokohama (JP);
Masaaki Hirano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 792 days.

(21) Appl. No.: 11/976,110

(22) Filed: Oct. 22, 2007

(65) Prior Publication Data
US 2010/0284658 A1    Nov. 11, 2010

Related U.S. Application Data

(63) Continuation-in-part of application No. 11/544,007, filed on Oct. 6, 2006, now Pat. No. 7,286,740.

(30) Foreign Application Priority Data

Oct. 7, 2005 (JP) .......................... P2005-295149

(51) Int. Cl.
*G02B 6/02* (2006.01)
*G02B 6/036* (2006.01)
*G02B 6/028* (2006.01)
*G02B 6/00* (2006.01)
*H04J 14/02* (2006.01)

(52) U.S. Cl. ........................ 385/127; 385/123; 385/124; 385/126; 385/128; 385/141; 385/142; 385/144; 398/81

(58) Field of Classification Search ................. 385/123, 385/124, 126, 127, 128, 141, 142, 144; 398/81
See application file for complete search history.

(56) References Cited

U.S. PATENT DOCUMENTS 6,181,858 B1 *   1/2001   Kato et al. .................. 385/123

(Continued)

FOREIGN PATENT DOCUMENTS

JP     3247221     11/2001

(Continued)

OTHER PUBLICATIONS

Kristensen, et al., "Dispersion and Slope Compensating Module for G.652 Fiber with x4 Reduced Physical Dimensions," ECOC-IOOC 2003 Proceedings, 2003, pp. 586-587, vol. 3, Paper We4.P.14-15.

(Continued)

*Primary Examiner*—Brian M Healy
(74) *Attorney, Agent, or Firm*—McDermott Will & Emery LLP

(57) ABSTRACT

The present invention relates to an optical fiber which has a structure for further increasing an FOM (=|dispersion|/loss) and which can be applied to a dispersion compensation module. The optical fiber is mainly composed of silica glass and has a core region including a center of an optical axis, a depressed region surrounding the core region, a ring region surrounding the depressed region, and a cladding region surrounding the ring region and doped with F. As compared with the refractive index of pure silica glass, a relative refractive index difference of the core region is greater than 2% but less than 3%, a relative refractive index difference of the depressed region is −1% or more but −0.5% or less, a relative refractive index difference of the ring region is 0.01% or more but 0.24% or less, and a relative refractive index difference of the cladding region is −0.3% or more but −0.1% or less. The FOM at the wavelength of 1550 nm is 250 ps/nm/dB or more.

16 Claims, 23 Drawing Sheets

U.S. PATENT DOCUMENTS

| | | | |
|---|---|---|---|
| 6,498,887 B1 | 12/2002 | Gruner-Nielsen et al. | |
| 7,286,740 B2 * | 10/2007 | Sasaki et al. | 385/127 |
| 7,787,731 B2 * | 8/2010 | Bookbinder et al. | 385/124 |
| 2003/0063878 A1 | 4/2003 | Matsuo et al. | |
| 2004/0109656 A1 | 6/2004 | Aikawa et al. | |
| 2004/0141701 A1 | 7/2004 | Yagi et al. | |
| 2005/0089289 A1 | 4/2005 | Hayami et al. | |
| 2005/0201703 A1 | 9/2005 | Yamamoto | |
| 2010/0284658 A1 * | 11/2010 | Sasaki et al. | 385/127 |

FOREIGN PATENT DOCUMENTS

| | | |
|---|---|---|
| JP | 2002-169049 | 6/2002 |
| JP | 2003-84162 | 3/2003 |
| JP | 2003-104751 | 4/2003 |
| JP | 2004-38006 | 2/2004 |
| JP | 2004-126141 | 4/2004 |
| JP | 2004-157507 | 6/2004 |
| JP | 3602152 | 10/2004 |
| JP | 2005-257928 | 9/2005 |

OTHER PUBLICATIONS

Grüner-Nielsen, et al., "Dispersion-Compensating Fibers," Journal of Lightwave Technology, Nov. 2005, pp. 3566-3579, vol. 23, No. 11.
International Preliminary Report on Patentability and Written Opinion issued in corresponding International Application No. PCT/JP2006/319970, dated Apr. 17, 2008.

* cited by examiner

Fig.6A
<SAMPLE1>

| | UNIT | VALUE |
|---|---|---|
| CORE Δ₁ | % | 3.1 |
| CORE DIAMETER | μm | 1.98 |
| Ra | — | 0.24 |
| Rb | — | 0.66 |
| DEPRESSED Δ₂ | % | -0.7 |
| RING Δ₃ | % | 0.13 |
| CLAD Δ₄ | % | -0.2 |

| | UNIT | VALUE | CONDITION |
|---|---|---|---|
| λc | nm | 1560 | 2m |
| CHROMATIC DISPERSION | ps/nm/km | -287 | 1550nm |
| DSCR | % | 100.1 | 1550nm |
| Aeff | μm² | 13.5 | 1550nm |
| RESIDUAL DISPERSION | ps/nm/km | ±0.1 | DSCR±10% |
| FOM | ps/nm/dB | 382.7 | 1550nm |
| BENDING LOSS | dB/m | 0.1 | DIAMETER OF 20mm AT 1550nm |
| MFD1 | μm | 7.5 | Pertermann-I |
| MAC1 | — | 4.82 | MFD1/λc |

Fig.6B
<SAMPLE2>

| | UNIT | VALUE |
|---|---|---|
| CORE Δ₁ | % | 3.4 |
| CORE DIAMETER | μm | 1.73 |
| Ra | — | 0.215 |
| Rb | — | 0.69 |
| DEPRESSED Δ₂ | % | -0.7 |
| RING Δ₃ | % | 0.155 |
| CLAD Δ₄ | % | -0.2 |

| | UNIT | VALUE | CONDITION |
|---|---|---|---|
| λc | nm | 1540 | 2m |
| CHROMATIC DISPERSION | ps/nm/km | -339.5 | 1550nm |
| DSCR | % | 109.8 | 1550nm |
| Aeff | μm² | 11.4 | 1550nm |
| RESIDUAL DISPERSION | ps/nm/km | ±0.15 | DSCR±10% |
| FOM | ps/nm/dB | 290.0 | 1550nm |
| BENDING LOSS | dB/m | 0.08 | DIAMETER OF 20mm AT 1550nm |
| MFD1 | μm | 8.22 | Pertermann-I |
| MAC1 | — | 5.33 | MFD1/λc |

Fig.6C
<COMPARATIVE EXAMPLE 1>

| | UNIT | VALUE |
|---|---|---|
| CORE DIAMETER | μm | 2.08 |
| Ra | — | 0.31 |
| Rb | — | 0.72 |
| CORE Δ₁ | % | 3.13 |
| DEPRESSED Δ₂ | % | -0.7 |
| RING Δ₃ | % | 0.33 |
| CLAD Δ₄ | % | 0.03 |

| | UNIT | VALUE | CONDITION |
|---|---|---|---|
| CHROMATIC DISPERSION | ps/nm/km | -285 | 1550nm |
| DSCR | % | 117.3 | 1550nm |
| Aeff | μm² | 12.54 | 1550nm |
| λc | nm | 1450 | 2m |
| RESIDUAL DISPERSION | ps/nm/km | — | |
| FOM | ps/nm/dB | 189.0 | loss=1.5dB/km |
| BENDING LOSS | dB/m | — | |
| MFD1 | μm | 8.3 | Pertermann-I |
| MAC1 | — | 5.72 | MFD1/λc |

Fig.15

|  | UNIT | DSCR=90% | DSCR=100% | DSCR=110% | DSCR=120% |
|---|---|---|---|---|---|
| OPTICAL FIBER 7 | km | 7.52 | 6.81 | 5.95 | 4.93 |
| OPTICAL FIBER 6 | km | 2.43 | 2.77 | 3.20 | 3.76 |

Fig.18

| | DISPERSION | DSCR | SPLICING LOSS (dB/SPLICE) | TRANSMISSION LOSS (dB/km) | DISPERSION COMPENSATION FOR 70km-SMF | |
|---|---|---|---|---|---|---|
| | | | | | MODULE LOSS | MODULE LOSS ESTIMATED FROM TRANSMISSION LOSS AND SPLICING LOSS |
| COMPARATIVE EXAMPLE 2 | -123.4 | 104% | 0.05 | 0.59 | 6.6 | 5.69 |
| OPTICAL FIBER 6 (SAMPLE 1) | -287 | 100% | 0.05 | 0.81 | 3.25 | 3.24 |

Fig.19

| | Δn | CHROMATIC DISPERSION (ps/nm/km) | TRANSMISSION LOSS (dB/km) | FOM (ps/nm/dB) | N2/Aeff (10⁻⁹ 1/W) | TOTAL DISPERSION VALUE OF SMF (ps/nm) | LENGTH OF DCF (km) | LOSS OF DCF (dB) | SPLICING LOSS +CONNECTOR LOSS (dB/ONE END) | TOTAL LOSS (dB) | Leff (km) | INPUT POWER P0(mW) | φSPM (rad) |
|---|---|---|---|---|---|---|---|---|---|---|---|---|---|
| SAMPLE 2 | 3.4 | -339.5 | 1.00 | 290 | 4.12 | -1700.0 | 5.7 | 5.7 | 0.30 | 6.27 | 3.2 | 0.3363 | 0.017 |
| SAMPLE 1 | 3.1 | -287 | 0.80 | 382.7 | 3.67 | -1700.0 | 6.1 | 4.9 | 0.30 | 5.46 | 3.7 | 0.2791 | 0.014 |
| COMPARATIVE EXAMPLE 3 | 2.5 | -145 | 0.58 | 250.00 | 2 | -1640.00 | 11.3 | 6.6 | 0.3 | 7.16 | 5.83 | 0.4 | 0.019 |

Fig.21A

<SAMPLE3>

| | UNIT | VALUE |
|---|---|---|
| CORE DIAMETER | μm | 1.87 |
| Ra | — | 0.232 |
| Rb | — | 0.781 |
| CORE Δ1 | % | 3.2 |
| DEPRESSED Δ2 | % | -0.7 |
| RING Δ3 | % | 0.21 |
| CLAD Δ4 | % | -0.2 |

| | UNIT | VALUE | CONDITION |
|---|---|---|---|
| CHROMATIC DISPERSION | ps/nm/km | -282.5 | 1550nm |
| DISPERSION SLOPE | ps/nm²/km | -0.98 | 1550nm |
| DSCR | % | 100.2 | 1550nm |
| LOSS | dB/km | 0.95 | 1550nm |
| λc | μm | 1.36 | 2m |
| FOM | ps/nm/dB | 297.4 | loss=1.5dB/km |
| MFD1 | μm | 6.88 | Petermann-I |
| MAC1 | — | 5.05 | MFD1/λc |

Fig.21B

<SAMPLE4>

| | UNIT | VALUE |
|---|---|---|
| CORE DIAMETER | μm | 1.92 |
| Ra | — | 0.24 |
| Rb | — | 0.637 |
| CORE Δ1 | % | 3.07 |
| DEPRESSED Δ2 | % | -0.7 |
| RING Δ3 | % | 0.04 |
| CLAD Δ4 | % | -0.2 |

| | UNIT | VALUE | CONDITION |
|---|---|---|---|
| CHROMATIC DISPERSION | ps/nm/km | -298.5 | 1550nm |
| DISPERSION SLOPE | ps/nm²/km | -1.0445 | 1550nm |
| DSCR | % | 102.5 | 1550nm |
| LOSS | dB/km | 0.84 | 1550nm |
| λc | μm | 1.49 | 2m |
| FOM | ps/nm/dB | 355.4 | loss=1.5dB/km |
| MFD1 | μm | 7.15 | Petermann-I |
| MAC1 | — | 4.80 | MFD1/λc |

Fig.22A

<SAMPLE5>

| | UNIT | VALUE |
|---|---|---|
| CORE Δ₁ | % | 2.91 |
| CORE DIAMETER | μm | 2.02 |
| Ra | — | 0.248 |
| Rb | — | 0.68 |
| DEPRESSED Δ₂ | % | -0.72 |
| RING Δ₃ | % | 0.17 |
| CLAD Δ₄ | % | -0.18 |

| | UNIT | VALUE | CONDITION |
|---|---|---|---|
| λc | nm | 1550 | 2m |
| CHROMATIC DISPERSION | ps/nm/km | -274 | 1550nm |
| DSCR | % | 98 | 1550nm |
| Aeff | μm² | 14 | 1550nm |
| RESIDUAL DISPERSION | ps/nm/km | ±0.12 | 1530~1565nm |
| FOM | ps/nm/dB | 360 | 1550nm |
| BENDING LOSS | dB/m | 1.2 | DIAMETER OF 20mm AT 1550nm |
| MFD1 | μm | 7.5 | Pertermann-I |
| MAC1 | — | 4.84 | MFD1/λc |

Fig.22B

<SAMPLE6>

| | UNIT | VALUE |
|---|---|---|
| CORE Δ₁ | % | 2.76 |
| CORE DIAMETER | μm | 2.01 |
| Ra | — | 0.22 |
| Rb | — | 0.78 |
| DEPRESSED Δ₂ | % | -0.77 |
| RING Δ₃ | % | 0.17 |
| CLAD Δ₄ | % | -0.29 |

| | UNIT | VALUE | CONDITION |
|---|---|---|---|
| λc | nm | 1420 | 2m |
| CHROMATIC DISPERSION | ps/nm/km | -255 | 1550nm |
| DSCR | % | 115 | 1550nm |
| Aeff | μm² | 14 | 1550nm |
| RESIDUAL DISPERSION | ps/nm/km | ±0.18 | 1530~1565nm |
| FOM | ps/nm/dB | 280 | 1550nm |
| BENDING LOSS | dB/m | 5.1 | DIAMETER OF 20mm AT 1550nm |
| MFD1 | μm | 7.7 | Pertermann-I |
| MAC1 | — | 5.42 | MFD1/λc |

Fig.22C

<SAMPLE7>

| | UNIT | VALUE |
|---|---|---|
| CORE Δ₁ | % | 2.54 |
| CORE DIAMETER | μm | 2.19 |
| Ra | — | 0.255 |
| Rb | — | 0.71 |
| DEPRESSED Δ₂ | % | -0.72 |
| RING Δ₃ | % | 0.21 |
| CLAD Δ₄ | % | -0.2 |

| | UNIT | VALUE | CONDITION |
|---|---|---|---|
| λc | nm | 1610 | 2m |
| CHROMATIC DISPERSION | ps/nm/km | -242 | 1550nm |
| DSCR | % | 102 | 1550nm |
| Aeff | μm² | 16 | 1550nm |
| RESIDUAL DISPERSION | ps/nm/km | ±0.10 | 1530~1565nm |
| FOM | ps/nm/dB | 345 | 1550nm |
| BENDING LOSS | dB/m | 9.5 | DIAMETER OF 20mm AT 1550nm |
| MFD1 | μm | 7.9 | Pertermann-I |
| MAC1 | — | 4.91 | MFD1/λc |

Fig.23A

<SAMPLE8>

| | UNIT | VALUE |
|---|---|---|
| CORE Δ₁ | μm | 2.25 |
| CORE DIAMETER | — | 2.40 |
| Ra | — | 0.275 |
| Rb | % | 0.71 |
| DEPRESSED Δ₂ | % | -0.76 |
| RING Δ₃ | % | 0.20 |
| CLAD Δ₄ | % | -0.22 |

| | UNIT | VALUE | CONDITION |
|---|---|---|---|
| λc | nm | 1720 | 2m |
| CHROMATIC DISPERSION | ps/nm/km | -218 | 1550nm |
| DSCR | % | 112 | 1550nm |
| Aeff | μm² | 14 | 1550nm |
| RESIDUAL DISPERSION | ps/nm/km | ±0.16 | 1530~1565nm |
| FOM | ps/nm/dB | 401 | 1550nm |
| BENDING LOSS | dB/m | 8.5 | DIAMETER OF 20mm AT 1550nm |
| MFD1 | μm | 7.9 | Petermann-I |
| MAC1 | — | 4.59 | MFD1/λc |

Fig.23B

<SAMPLE9>

| | UNIT | VALUE |
|---|---|---|
| CORE Δ₁ | μm | 2.05 |
| CORE DIAMETER | — | 2.66 |
| Ra | — | 0.33 |
| Rb | % | 0.65 |
| DEPRESSED Δ₂ | % | -0.76 |
| RING Δ₃ | % | 0.20 |
| CLAD Δ₄ | % | -0.12 |

| | UNIT | VALUE | CONDITION |
|---|---|---|---|
| λc | nm | 1620 | 2m |
| CHROMATIC DISPERSION | ps/nm/km | -195 | 1550nm |
| DSCR | % | 90 | 1550nm |
| Aeff | μm² | 17 | 1550nm |
| RESIDUAL DISPERSION | ps/nm/km | ±0.14 | 1530~1565nm |
| FOM | ps/nm/dB | 340 | 1550nm |
| BENDING LOSS | dB/m | 3 | DIAMETER OF 20mm AT 1550nm |
| MFD1 | μm | 7.9 | Petermann-I |
| MAC1 | — | 4.88 | MFD1/λc |

US 7,894,697 B2

OPTICAL FIBER, OPTICAL TRANSMISSION LINE, OPTICAL MODULE, AND OPTICAL TRANSMISSION SYSTEM

CROSS-REFERENCE TO RELATED APPLICATION

This is a Continuation-In-Part application of the patent application serial No. 11/544,007 filed on Oct. 6, 2006 by the same Applicant, now U.S. Pat. No. 7,286,740

BACKGROUND OF THE INVENTION

1. Field of the Invention

The present invention relates to an optical transmission system for transmitting signal light through an optical fiber transmission line, and to an optical fiber and others for compensating for chromatic dispersion of the entire optical fiber transmission line.

2. Related Background Art

An optical transmission system uses a Single Mode Fiber (SMF) in conformity with ITU-G652.C, comprised primarily of silica glass, as an optical fiber transmission line for transmitting signal light. The C-band (1530 nm-1565 nm) is used as a wavelength band of signal light and the L-band (1565 nm-1625 nm) is also used. The SMF has the chromatic dispersion of 12 ps/nm/km or more but 21 ps/nm/km or less and the dispersion slope of 0.04 ps/nm$^2$/km or more but 0.10 ps/nm$^2$/km or less at the wavelength of 1550 nm.

When signal light is transmitted through the optical fiber transmission line consisting of such SMF, the waveform of signal light is deteriorated by chromatic dispersion in the SMF and it makes high-speed transmission difficult. Therefore, a dispersion compensator to compensate the chromatic dispersion of the optical fiber transmission line consisting of the SMF is inserted into the signal light transmission line. Examples of the dispersion compensator used commonly include a dispersion compensating fiber with chromatic dispersion negative in the C-band, and a dispersion compensating fiber with negative dispersion slope to compensate for wavelength dependence of chromatic dispersion as well (e.g., cf. Patent Documents 1-4).

[Patent Document 1] Japanese Patent Application Laid-Open No. 2002-169049

[Patent Document 2] Japanese Patent Application Laid-Open No. 2003-84162

[Patent Document 3] Japanese Patent No. 3602152

[Patent Document 4] Japanese Patent No. 3247221

[Non-patent Document 1] ECOC-IOOC Proceedings Vol. 3, Paper We4. P. 14-15, 2003

SUMMARY OF THE INVENTION

The inventors have studied the above-described prior arts in detail, and as a result, have found problems as follows. Namely, the dispersion compensating fiber is generally connected in cascade to the SMF and forms a part of the optical transmission line. For this reason, the dispersion compensating fiber is required to have a large absolute value of chromatic dispersion D and a small transmission loss α. Namely, the dispersion compensating fiber desirably has a large performance index (FOM: Figure of Merit) which is expressed by an absolute value of a ratio (D/α). In the conventional dispersion compensating fibers including those disclosed in Patent Documents 1-4 above, the absolute value of the chromatic dispersion D can be increased by increasing a relative refractive index difference of the center core region, while it is, however, necessary to increase a concentration of Ge doped in the core, in order to increase the relative refractive index difference (Δn) of the core. Since it results in increasing the Rayleigh scattering coefficient, which is due to scattering inside glass, the transmission loss α also increases, and it results in failure in achieving a large FOM.

The present invention has been accomplished in order to solve the above problem and an object of the invention is to provide an optical fiber suitable for a dispersion compensator in an optical transmission line and having a structure for further increasing the FOM, an optical transmission line including the optical fiber, and an optical transmission system in which the optical fiber is applied to a part of an optical transmission line.

An optical fiber according to the present invention is an optical fiber mainly composed of silica glass, which has a core region including a center of an optical axis, a depressed region surrounding the core region, a ring region surrounding the depressed region, and a cladding region surrounding the ring region and doped with F. In the optical fiber, as compared with the refractive index of pure silica glass, a relative refractive index difference of the core region is greater than 2% but 4% or less (including the lower part range of greater than 2% but less than 3%, and the upper part range of 3% or more but 4% or less), a relative refractive index difference of the depressed region is −1% or more but −0.5% or less, a relative refractive index difference of the ring region is 0.01% or more but 0.24% or less, and a relative refractive index difference of the cladding region is −0.3% or more but −0.1% or less. A ratio Ra (=2a/2b) of an outside diameter 2a of the core region to an outside diameter 2b of the depressed region is 0.15 or more but 0.35 or less. A ratio Rb (=2b/2c) of the outside diameter 2b of the depressed region to an outside diameter 2c of the ring region is 0.55 or more but 0.85 or less and, more preferably, 0.55 or more but 0.75 or less. The outside diameter 2a of the core region is 1.5 μm or more but 2.5 μm or less and an FOM (=|dispersion|/loss) at a wavelength of 1550 nm is 250 ps/nm/dB or more.

The optical fiber according to the present invention preferably has the following characteristics in the C-band: a chromatic dispersion of −150 ps/nm/km or less, more preferably −250 ps/nm/km or less; an RDS (=S/D) of 0.002 nm$^{-1}$ or more but 0.01 nm$^{-1}$ or less, which is defined by a ratio of a dispersion slope S to the chromatic dispersion D;

a bending loss of 100 dB/m or less, more preferably 10 dB/m or less when being bent in a diameter of 20 mm. A cutoff wavelength of the optical fiber is preferably 1.2 μm or more but 1.8 μm or less.

In the optical fiber according to the present invention, preferably, a variation of loss in a 1380 nm wavelength band is 0.3 dB/km or less with regard to an exposure to a hydrogen atmosphere (H2 100%, 80° C., 1 atm pressure) for 20 hours.

When an optical transmission line is constructed by connecting the foregoing optical fiber of a designated length to a single mode fiber having the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less, a residual dispersion amount of the entire optical transmission line is preferably 0.3 ps/nm/km or less in the C-band or in the L-band. Furthermore, when an optical transmission line is constructed by connecting the foregoing optical fiber of a designated length to a single mode fiber having the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less, a residual dispersion amount of the entire optical transmission line is preferably 0.5 ps/nm/km or less in a wavelength range including the C-band and the L-band.

The optical fiber according to the present invention preferably has a transmission loss of 0.5 dB/km or more but 1.0 dB/km or less at the wavelength of 1550 nm. The optical fiber according to the present invention preferably has a polarization mode dispersion of 0.3 ps/km$^{1/2}$ or less at the wavelength of 1550 nm.

When the optical fiber according to the present invention is fusion-spliced to a single mode fiber having the following characteristics at the wavelength of 1550 nm: a chromatic dispersion of 12 ps/nm/km or more but 21 ps/nm/lcm or less; and a dispersion slope of 0.04 ps/nm$^2$/km or more but 0.10 ps/nm$^2$/km or less, it preferably has a splicing loss of 0.30 dB or less per spliced portion at the wavelength of 1550 nm and a splicing loss of 0.25 dB or less at a wavelength of 1620 nm.

An optical transmission line according to the present invention comprises a single mode fiber, and an optical fiber having the structure as described above (the optical fiber according to the present invention), and has a first structure in which these single mode fiber and optical fiber are connected in cascade. Another optical transmission line according to the present invention may be one comprising a single mode fiber, a first dispersion compensating fiber, and a second dispersion compensating fiber different from the first dispersion compensating fiber, and having a second structure in which these single mode fiber, first dispersion compensating fiber, and second dispersion compensating fiber are connected in cascade. The single mode fiber has the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less. The first dispersion compensating fiber has the same structure as the optical fiber having the aforementioned structure (the optical fiber according to the present invention). Here, when a first line configuration consists of the single mode fiber and the second dispersion compensating fiber and a second line configuration consists of the single mode fiber and the first dispersion compensating fiber, the second compensating fiber preferably has a dispersion characteristics such that, in the C-band, a convex direction of a residual dispersion spectrum in the first line configuration is opposite to a convex direction of a residual dispersion spectrum in the second line configuration. Particularly, in the optical transmission line having the second structure, each of the first and second dispersion compensating fibers substantially compensate for total dispersion of the single mode fiber in the 1550 nm wavelength band, and the lengths of the first and second dispersion compensating fibers are adjusted so as to decrease the residual dispersion in a used wavelength band.

In the optical transmission line according to the present invention, a maximum residual dispersion amount in a wavelength range from 1550 nm to 1610 nm is preferably 0.04 ps/nm/km.

An optical module according to the present invention comprises an optical fiber having the structure as described above (the optical fiber according to the present invention), which is modularized.

An optical transmission system according to the present invention comprises an optical fiber transmission line for transmitting signal light, and an optical fiber having the structure as described above (the optical fiber according to the present invention), as a dispersion compensator for compensating for chromatic dispersion of the optical fiber transmission line.

Furthermore, an optical fiber of another configuration according to the present invention is an optical fiber mainly composed of silica glass and comprising a core region including a center of an optical axis, a depressed region surrounding the core region, a ring region surrounding the depressed region, and a cladding region surrounding the ring region and doped with F. In the optical fiber, as compared with the refractive index of pure silica glass, a relative refractive index difference of the core region is greater than 2% but 4% or less (including the lower part range of greater than 2% but less than 3%, and the upper part range of 3% or more but 4% or less), a relative refractive index difference of the depressed region is −1% or more but −0.5% or less, a relative refractive index difference of the ring region is 0.01% or more but 0.24% or less, and a relative refractive index difference of the cladding region is -0.3% or more but -0.1% or less. Here, when the relative refractive index difference of the core region falls within the lower part range, it is more preferable that the relative refractive index difference of the core region falls within the range of 2.2% or more but less than 3%. A ratio Ra (=2a/2b) of an outside diameter 2a of the core region to an outside diameter 2b of the depressed region is 0.15 or more but 0.35 or less, and a ratio Rb (=2b/2c) of the outside diameter 2b of the depressed region to an outside diameter 2c of the ring region is 0.55 or more but 0.85 or less, more preferably 0.55 or more but 0.75 or less. The outside diameter 2a of the core region is 1.5 μm or more but 3 μm or less, more preferably 1.5 μm or more but 2.5 μm or less, and an FOM (=|dispersion|/loss) at the wavelength of 1550 nm is 250 ps/nm/dB or more. In addition, the optical fiber has the following characteristics in the C-band: a chromatic dispersion of −150 ps/nm/km or less, more preferably −250 ps/nm/km or less; an RDS (=S/D) of 0.002 nm$^{-1}$ or more but 0.01 nm$^{-1}$ or less, which is defined by a ratio of the dispersion slope S to the chromatic dispersion D; a bending loss of 100 dB/m or more, more preferably 10 dB/m or less in a bend diameter of 20 mm. A cutoff wavelength is 1.2 μm or more but 1.8 μm or less, and a polarization mode dispersion at the wavelength of 1550 nm is 0.3 ps/km$^{1/2}$ or less. When the optical fiber is fusion-spliced to a single mode fiber having the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less, the optical fiber has a splicing loss of 0.30 dB or less at the wavelength of 1550 nm and a splicing loss of 0.25 dB or less at the wavelength of 1620 nm.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 6A to 6C are tables showing characteristics of Sample 1 and Sample 2 prepared as optical fibers according to the present invention, and characteristics of Comparative Example 1;

FIG. 15 is a table showing a list of residual dispersion values in cases where each of an optical fiber and another fiber according to the present invention is connected to an SMF;

FIG. 18 is a table showing a list of characteristics of an optical fiber where the optical fiber according to the present invention is modularized as a dispersion compensator;

FIG. 19 is a table showing a list of characteristics of respective dispersion compensation modules to which each of samples (Sample 1 and Sample 2) of optical fibers according to the present invention, and Comparative Example 3 is applied;

FIGS. 21A and 21B are tables showing lists of characteristics of Sample 3 and Sample 4 prepared as optical fibers according to the present invention;

FIGS. 22A to 22C are tables showing lists of characteristics of Samples 5 to 7 prepared as optical fibers according to the present invention; and FIGS. 23A and 23B are tables showing lists of characteristics of Sample 8 and Sample 9 prepared as optical fibers according to the present invention.

DETAILED DESCRIPTION OF THE PREFERRED EMBODIMENTS

In the following, embodiments of an optical fiber, an optical transmission line, an optical module, and an optical transmission system according to the present invention will be described with reference to FIGS. 1A-3B, 4, 5, 6A-7C, 8-20, and 21A-23B. In the description of the drawings identical elements will be denoted by the same reference symbols, without redundant description.

Figure 1A:
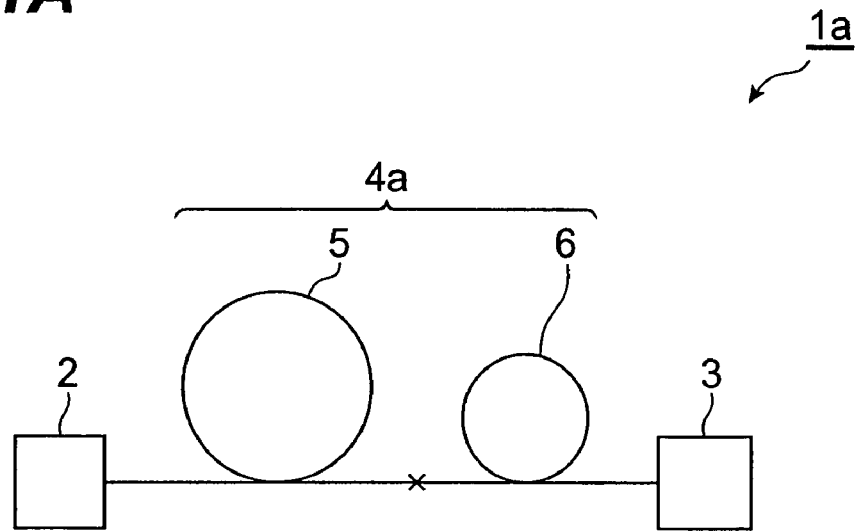
FIGS. 1A and 1B are drawings showing schematic configurations of optical transmission systems according to the present invention.
Figure 1B:
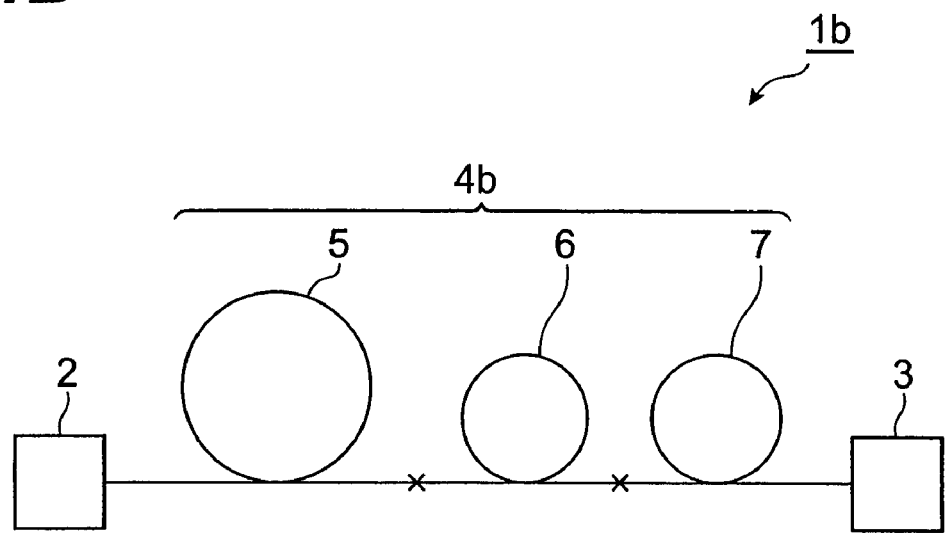

FIGS. 1A and 1B are drawings showing schematic configurations of optical transmission systems according to the present invention. The optical transmission system 1a shown in FIG. 1A comprises an optical transmitter 2, an optical receiver 3, and an optical transmission line 4a located between these optical transmitter 2 and optical receiver 3, and the optical transmission line 4a is constructed in a configuration in which a single mode fiber (SMF) 5 and an optical fiber 6 according to the present invention, which is prepared as a dispersion compensating fiber, are connected in cascade. The optical transmission system 1b shown in FIG. 1B comprises an optical transmitter 2, an optical receiver 3, and an optical transmission line 4b located between these optical transmitter 2 and optical receiver 3, and the optical transmission line 4b is constructed in a configuration in which a single mode fiber (SMF) 5, an optical fiber 6 according to the present invention, which is prepared as a Dispersion Compensating Fiber (DCF), and another optical fiber 7 prepared as another dispersion compensating fiber different from the optical fiber 6 are connected in cascade. The optical transmission systems 1a, 1b both are supposed to use signal light in the C-band or signal light in the L-band sent out from the optical transmitter 2.

The SMF 5 has the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less. Each of the optical fibers 6, 7 has the chromatic dispersion negative in the C-band and in the L-band and compensates for the chromatic dispersion of SMF 5. The optical fiber 6 is an optical fiber according to the present invention, in which wavelength dependence of residual dispersion spectrum in a wavelength band near the wavelength of 1550 nm has a downwardly convex shape in a state in which a total dispersion amount when connected to the SMF is adjusted to zero. On the other hand, the optical fiber 7 is one in which wavelength dependence of residual dispersion spectrum in a wavelength band near the wavelength of 1550 nm has an upwardly convex shape in a state in which the total dispersion amount when connected to the SMF is adjusted to zero. In the optical fiber 7, wavelength dependence of dispersion characteristic in a wavelength band near the wavelength of 1550 nm has an upwardly convex shape. The optical fibers 6, 7 may be laid between the optical transmitter 2 and the optical receiver 3 or may be modularized as housed in a coil-wound state in a case.

Figure 2A:
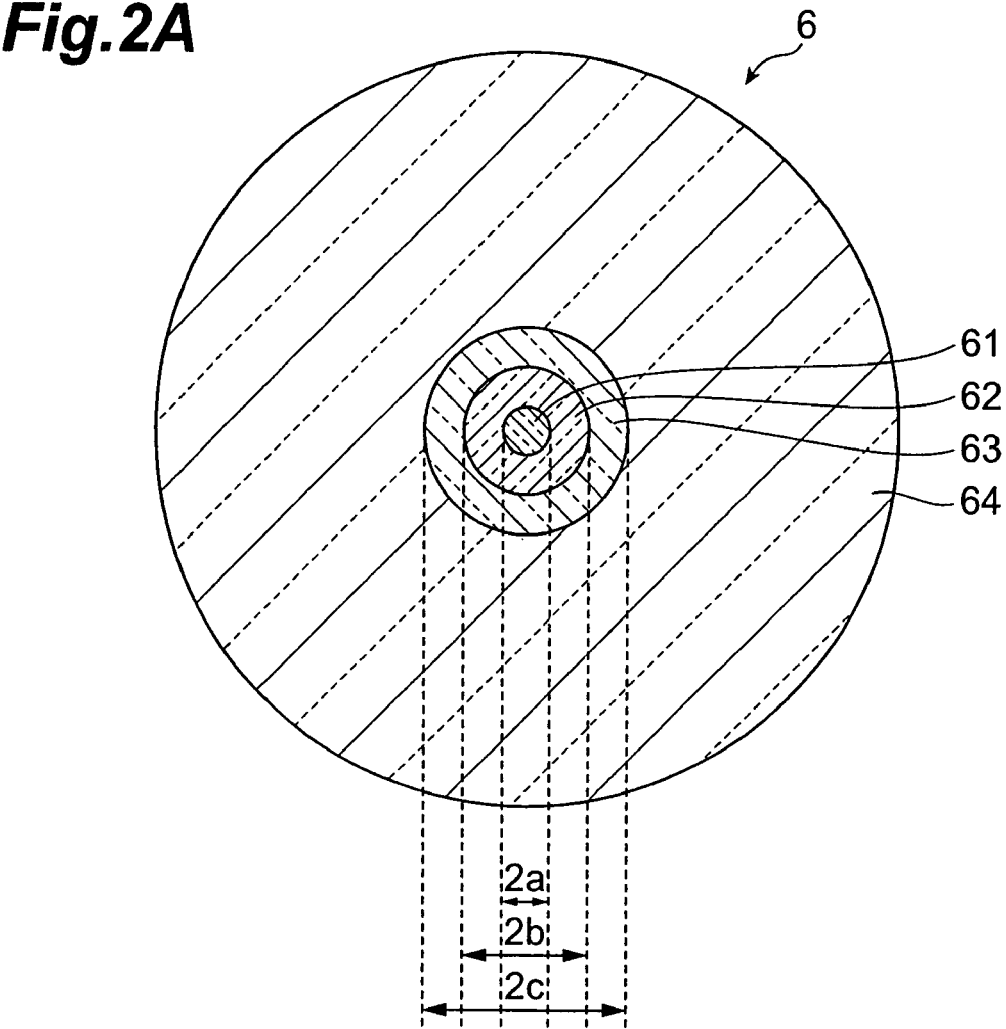
FIGS. 2A and 2B are a sectional view showing a structure of an optical fiber according to the present invention, and a refractive index profile thereof.
Figure 2B:
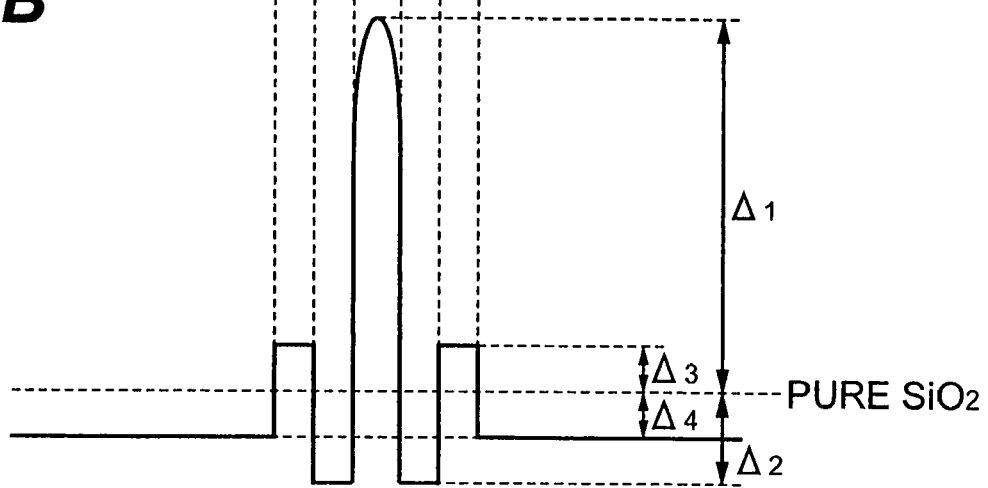

FIGS. 2A and 2B are a sectional view showing a structure of the optical fiber 6 according to the present invention and a refractive index profile thereof. FIG. 2A shows the sectional structure of the optical fiber 6 perpendicular to the optical axis. FIG. 2B shows the refractive index profile in a radial direction in the optical fiber 6. The optical fiber 6 according to the present invention comprises a core region 61 including the center of the optical axis so as to extend along a designated axis, a depressed region 62 provided on the outer periphery of the core region 61, a ring region 63 provided on the outer periphery of the depressed region 62, and a cladding region 64 provided on the outer periphery of the ring region 63.

Each of the core region 61, depressed region 62, ring region 63, and cladding region 64 is a region composed of silica glass. Each of the core region 61 and the ring region 63 is doped with at least $GeO_2$ and each of the depressed region 62 and the cladding region 64 is doped with at least F. At the wavelength of 633 nm, as compared with the refractive index of pure silica glass, a relative refractive index difference $\Delta_1$ of the core region 61 is greater than 2 but 4% or less (including the lower part range of greater than 2% but less than 3%, and the upper part range of 3% or more but 4% or less), a relative refractive index difference $\Delta_2$ of the depressed region 62 is −1% or more but −0.5% or less, a relative refractive index difference $\Delta_3$ of the ring region 63 is 0.01% or more but 0.24% or less, and a relative refractive index difference $\Delta_4$ of the cladding region 64 is −0.3% or more but −0.1% or less.

A ratio Ra (=2a/2b) of an outside diameter 2a of the core region 61 to an outside diameter 2b of the depressed region 62 is 0.15 or more but 0.35 or less. A ratio Rb (=2b/2c) of the outside diameter 2b of the depressed region 62 to an outside diameter 2c of the ring region 63 is 0.55 or more but 0.85 or less. In the optical fiber 6 according to the present invention, the ratio Rb (=2b/2c) of the outside diameter 2b of the depressed region 62 to the outside diameter 2c of the ring region 63 may be 0.55 or more but 0.75 or less. The outside diameter 2a of the core region is 1.5 μm or more but 3 μm or less, more preferably 1.5 μm or more but 2.5 μm or less. The FOM (=|dispersion|/loss) being a performance index at the wavelength of 1550 nm is 250 ps/nm/dB or more.

The cladding region 64 may include an optical cladding region and a physical cladding region. In this case, the outermost physical cladding region is also doped with F, and relative refractive index differences of the respective optical cladding region and physical cladding region are equal to each other. An optical fiber preform for obtaining such optical fiber 6 can be produced by VAD, MCVD, OVD, DVD, or collapse method.

The optical fiber 6 according to the present invention preferably has the following characteristics in the C-band: a chromatic dispersion of −150 ps/nm/km or less, more preferably −250 ps/nm/km or less; an RDS (=S/D) of 0.02 $nm^1$ or more but 0.10 $nm^1$ or less, which is defined by a ratio of dispersion slope S to dispersion D; a bending loss of 100 dB/m or less, more preferably 10 dB/m or less when being bent in the diameter of 20 mm. A cutoff wavelength λc is 1.2 μm or more but 1.8 μm or less. A variation of loss in the 1380 nm wavelength band with respect to an exposure to a hydrogen atmosphere ($H_2$ 100%, 80° C., 1 atmosphere pressure) for 20 hours is 0.3 dB/km or less.

When the optical fiber 6 of a designated length is connected to the SMF 5, a residual dispersion amount of the whole line (SMF 5+optical fiber 6) in the C-band is 0.3 ps/nm/km or less.

When the optical fiber 6 of a designated length is connected to the SMF 5, a residual dispersion amount of the whole line (SMF 5+optical fiber 6) in a wavelength range including the C-band and L-band is 0.5 ps/nm/km or less. At the wavelength of 1550 nm, a transmission loss of the optical fiber 6 is 0.5 dB/km or more but 1.0 dB/km or less. At the wavelength of 1550 nm, a polarization mode dispersion of the optical fiber 6 is 0.3 $ps/km^{1/2}$ or less. The optical fiber 6, when fusion-spliced to the SMF 5, has a splicing loss of 0.3 dB or less at the wavelength of 1550 nm and a splicing loss of 0.25 dB or less at the wavelength of 1620 nm.

Figure 3A:
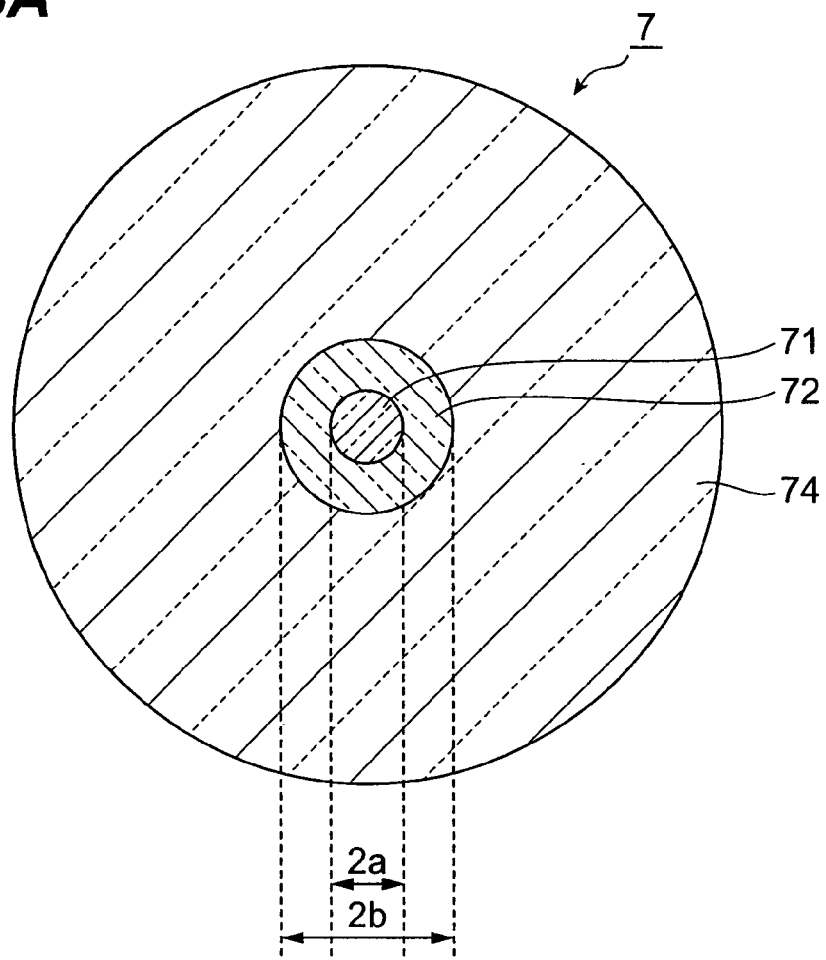
FIGS. 3A and 3B are a sectional view showing a structure of another dispersion compensating fiber different from the optical fiber according to the present invention, and a refractive index profile thereof.
Figure 3B:
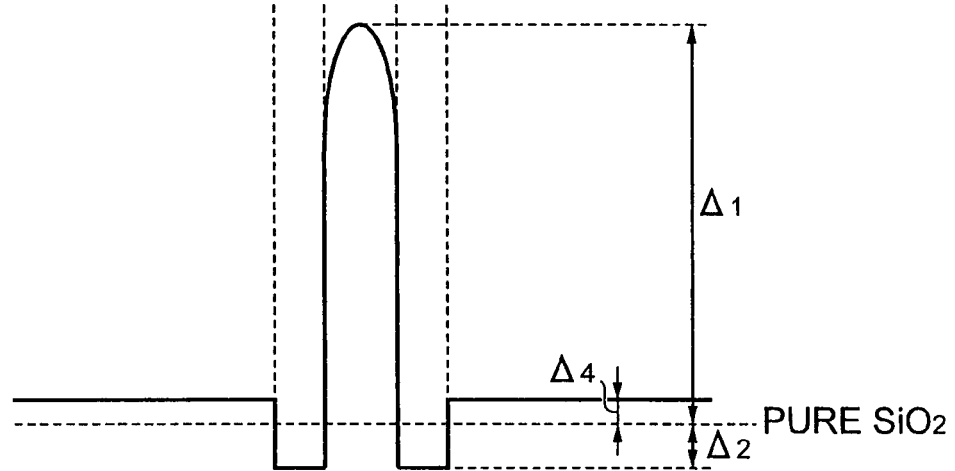

FIGS. 3A and 3B are a sectional view showing a structure of the optical fiber 7 and a refractive index profile thereof. FIG. 3A shows a cross section of the optical fiber 7 perpendicular to the optical axis. FIG. 3B shows the refractive index profile in a radial direction in the optical fiber 7. The optical fiber 7 comprises a core region 71 including the center of the optical axis so as to extend along a designated axis, a depressed region 72 provided on the outer periphery of the core region 71, and a cladding region 74 provided on the outer periphery of the depressed region 72. The optical fiber 7 is arranged, for example, as follows: at the wavelength of 633 nm, as compared with the refractive index of pure silica glass, a relative refractive index difference $\Delta_1$ of the core region 71 is 2.6%, a relative refractive index difference $\Delta_2$ of the depressed region 72 is −0.37%, and a relative refractive index difference $\Delta_4$ of the cladding region 74 is 0.09%. A ratio Ra (=2a/2b) of an outside diameter 2a of the core region 71 to an outside diameter 2b of the depressed region 72 is 0.29. The outside diameter 2a of the core region is 2.39 μm.

Figure 4:
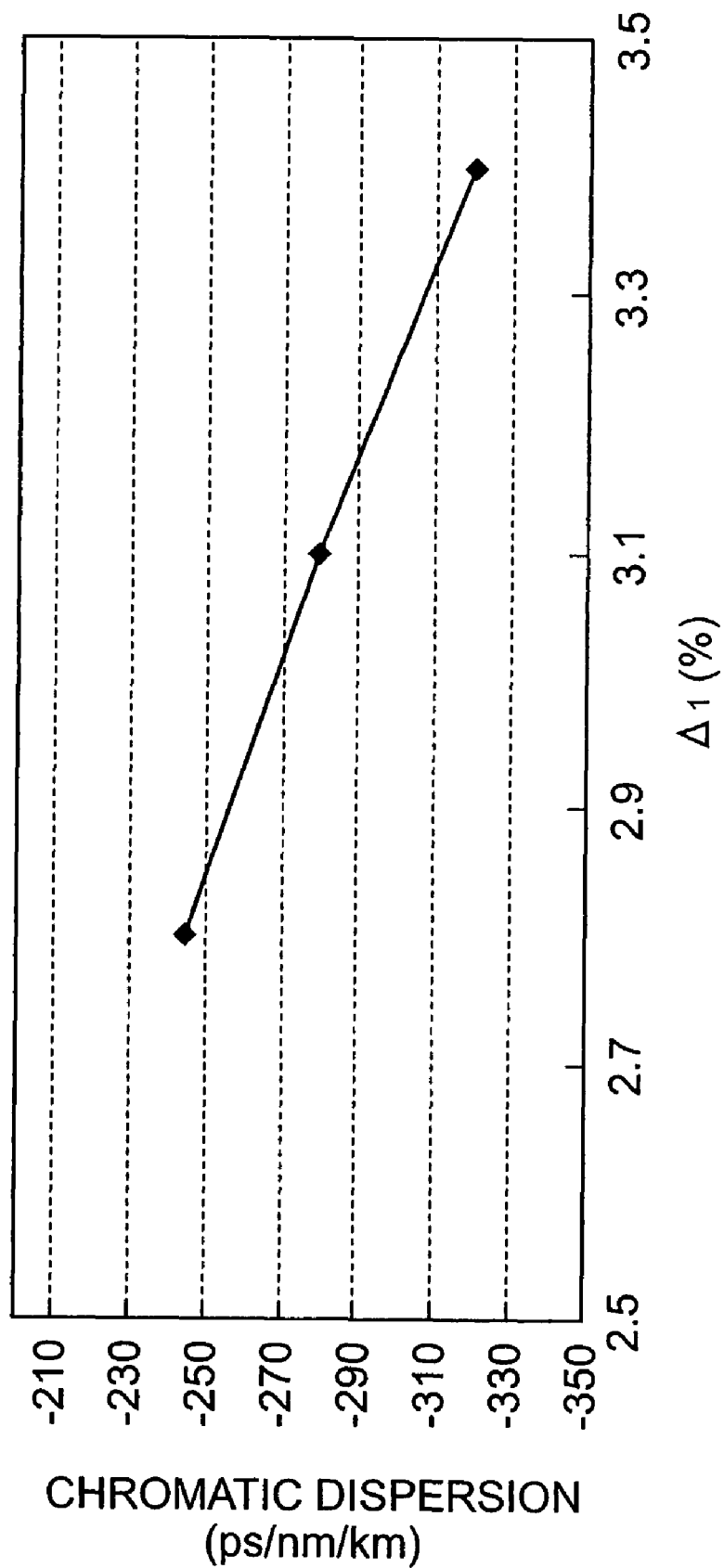
FIG. 4 is a graph showing a relation between chromatic dispersion of optical fiber 6 according to an embodiment of the invention, and relative refractive index difference $\Delta_1$ of core region 61.

FIG. 4 is a graph showing a relation between chromatic dispersion of optical fiber 6 according to the present invention and relative refractive index difference $\Delta_1$ of the core region 61. In the optical fiber 6 prepared for this measurement, the relative refractive index difference $\Delta_2$ of the depressed region 62 is −0.7%, the relative refractive index difference $\Delta_4$ of the cladding region 64 is −0.2%, the RDS is 0.0035 $nm^{-1}$, the Petermann-I mode field diameter (MFD1) is 8 μm or less, the cutoff wavelength λc is 1.2 μm or more, and the dispersion slope compensation rate DSCR is 110±10%. The dispersion slope compensation rate DSCR (%) is defined by the equation of "DSCR=$(D_{SMF}/S_{SMF})/(D_{DCF}/S_{DCF}) \times 100$," where $D_{SMF}$ represents the chromatic dispersion of SMF 5, $S_{SMF}$ represents the dispersion slope of SMF 5, $D_{DCF}$ represents the chromatic dispersion of the optical fiber 6, and $S_{DCF}$ represents the dispersion slope of the optical fiber 6. The outside diameter 2a of the core region 61, the outside diameter 2b of the depressed region 62, the outside diameter 2c of the ring region 53, and the relative refractive index difference $\Delta_3$ of the ring region 53 were determined by adjusting MFD1, λc, etc. each time to obtain a maximum chromatic dispersion. It is apparent from this graph that the absolute value of chromatic dispersion increases as the relative refractive index difference $\Delta_1$ of the core region 61 becomes larger.

Figure 5:
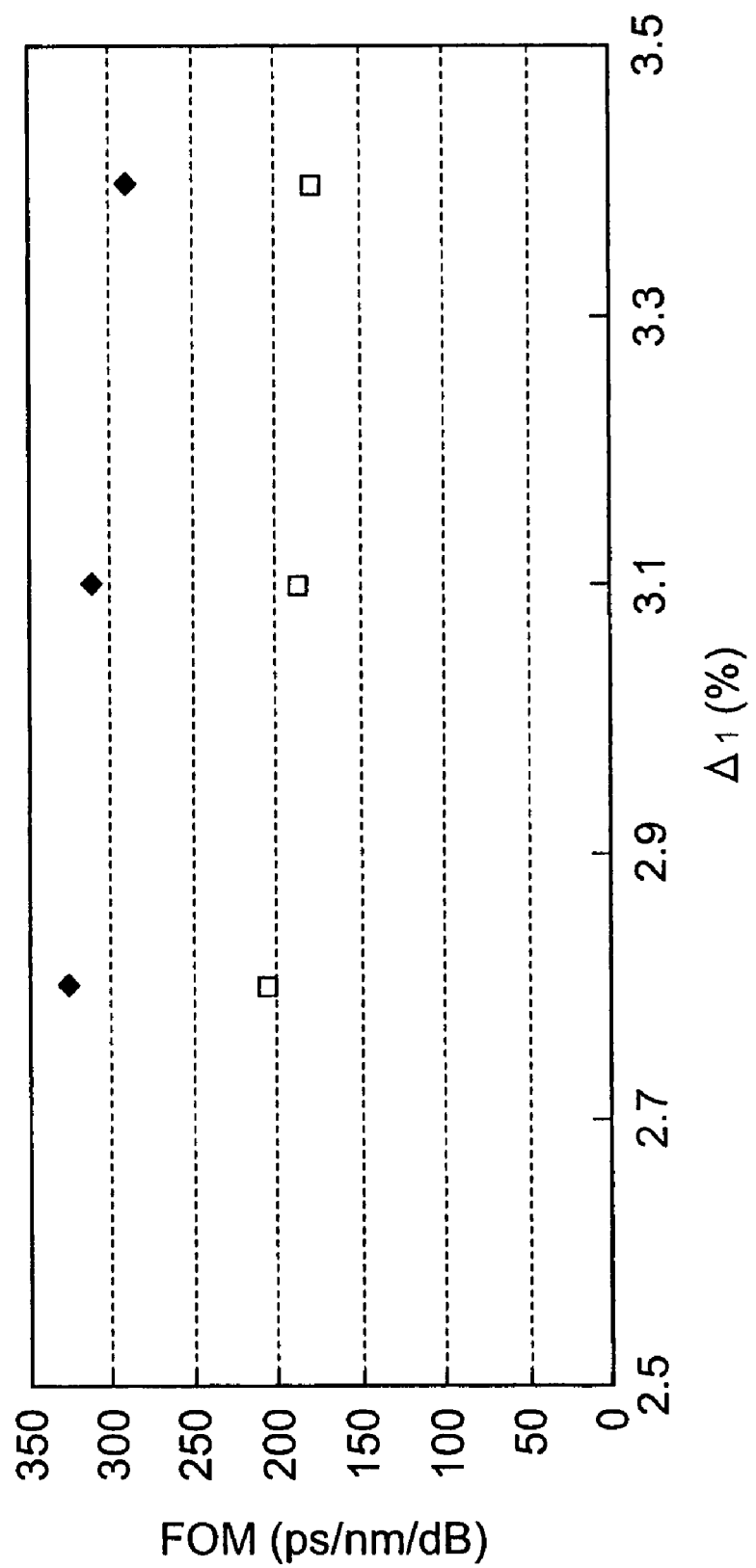
FIG. 5 is a graph showing a relation between FOM and relative refractive index difference $\Delta_1$ of the core region (relative refractive index difference of the core region as compared with pure silica glass) in an optical fiber according to the present invention.

FIG. 5 is a graph showing a relation between FOM and relative refractive index difference $\Delta_1$ of the core region 61 in optical fibers 6 according to the present invention. Marks "◆" plotted in the graph indicate measurement results of optical fibers 6 (in which the cladding region is doped with F), and marks "□" measurement results of optical fibers which have an index profile similar to the index profile shown in FIG. 2B and have a cladding region being composed of pure silica. The optical fibers 6 prepared herein were set as follows: the relative refractive index difference $\Delta_2$ of the depressed region 62 is −0.7%; the relative refractive index difference $\Delta_4$ of the cladding region 64 is −0.2%; the RDS 0.0035 $nm^{-1}$; the Petermann-I mode field diameter (MFD1) is 8 μm or less; the cutoff wavelength λc is 1.2 μm or more; the dispersion slope compensation rate DSCR is 110±10%. The optical fibers prepared as a comparative example were those in which only the cladding region was composed of pure silica. The outside diameter 2a of the core region 61, the outside diameter 2b of the depressed region 62, the outside diameter 2c of the ring region 53, and the relative refractive index difference $\Delta_3$ of the ring region 53 were determined by adjusting MFD1, λc, etc. each time to obtain a maximum chromatic dispersion and FOM. Since in the optical fibers 6 of the present invention the cladding region 64 is doped with F, a melt temperature during drawing of the fiber can be approximately 150° C. lower than in the case of a preform with a pure silica cladding not doped with F, and the fictive temperature of the fiber is thus lowered. For this reason, the transmission loss can be reduced. Therefore, as seen from the graph shown in FIG. 5, the optical fibers 6 according to the present invention have the larger FOMs, when compared with the optical fibers in which the cladding region is composed of pure silica glass.

FIGS. 6A-6C are tables showing lists of characteristics of two samples (Sample 1 and Sample 2 prepared as a sample in which a relative refractive index difference of the core region falls within the upper part range of 3% or more but 4% or less) prepared as optical fibers 6 according to the present invention, and Comparative Example 1. As shown in FIG. 6A, the optical fiber of Sample 1 corresponds to the optical fiber 6 in which the relative refractive index difference $\Delta_1$ of the core region is 3.1% in FIG. 5. As shown in FIG. 6B, the optical fiber of Sample 2 corresponds to the example of the optical fiber 6 in which the relative refractive index difference $\Delta_1$ of the core region is 3.4% in FIG. 5. As shown in FIG. 6C, the optical fiber of Comparative Example 1 corresponds to the optical fiber in which the relative refractive index difference $\Delta_1$ of the core region is 3.1% in FIG. 5 and in which the cladding region is composed of pure silica glass.

Figure 7A:
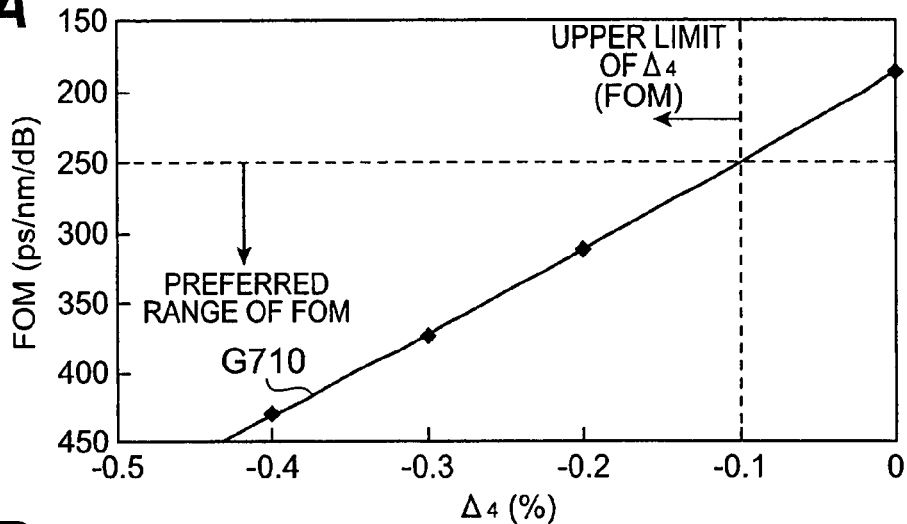
FIGS. 7A to 7C are graphs showing relations of FOM and noncircularity against relative refractive index difference $\Delta_4$ of cladding (relative refractive index difference of the cladding region as compared with pure silica glass) in optical fibers according to the present invention.
Figure 7B:
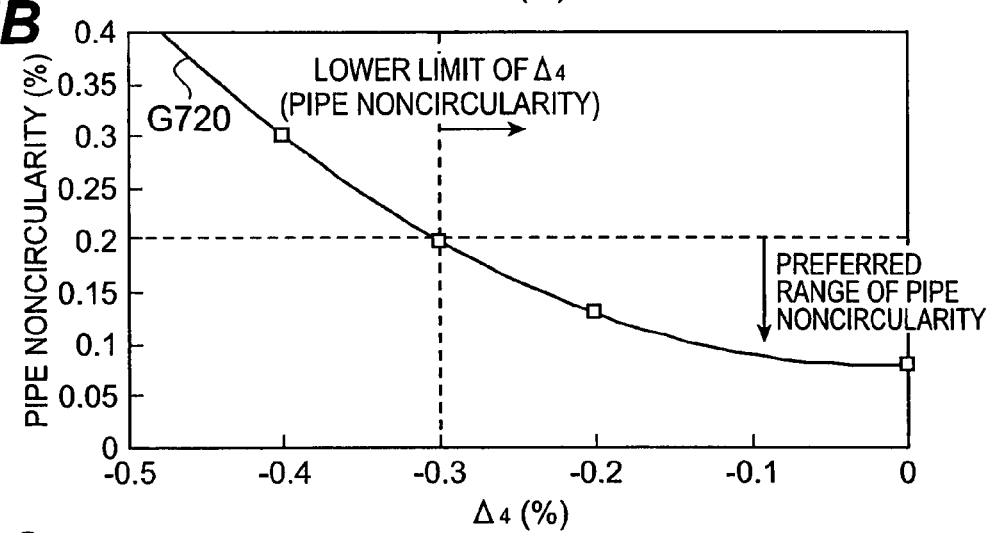
Figure 7C:
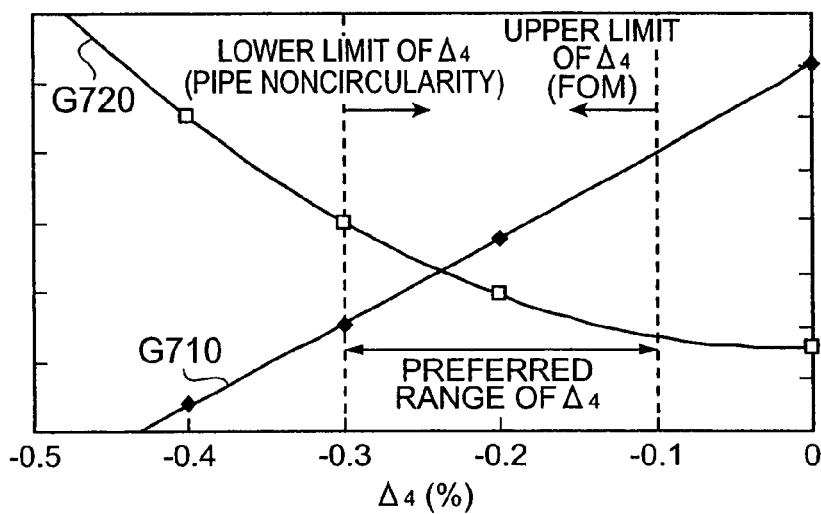

FIGS. 7A-7C are graphs showing relations of FOM and noncircularity of optical fibers 6 according to the present invention, against relative refractive index difference $\Delta_4$ of the cladding region 64. Particularly, FIG. 7A shows the relation of FOM against relative refractive index difference $\Delta_4$ of the cladding region 64, FIG. 7B the relation of noncircularity against relative refractive index difference $\Delta_4$ of the cladding region 64, and FIG. 7C an effective range of relative refractive index difference of the cladding region 64, which is defined by an upper bound of relative refractive index difference of the cladding region 64 derived from the relation of FOM and a lower bound of relative refractive index difference of the cladding region 64 derived from the relation of noncircularity. As seen from these figures, the relative refractive index difference $\Delta_4$ of the cladding region 64 affects the FOM and noncircularity of optical fiber 6. The FOM is preferably 250 ps/nm/dB or more and in this regard the relative refractive index difference $\Delta_4$ of the cladding region 64 is preferably −0.1% or less. The optical fiber 6 applied to a dispersion compensator had the polarization mode dispersion of 0.4 ps/km$^{1/2}$ in the case of pipe noncircularity of 0.3%, and the polarization mode dispersion of 0.2 ps/km$^{1/2}$ in the case of pipe noncircularity of 0.13%. Therefore, the noncircularity is preferably 0.2% or less, in order to reduce the polarization mode dispersion. In this respect, the relative refractive index difference $\Delta_4$ of the cladding region 64 is preferably −0.3% or more. After all, the relative refractive index difference $\Delta_4$ of the cladding region 64 is preferably −0.3% or more but −0.1% or less.

Figure 8:
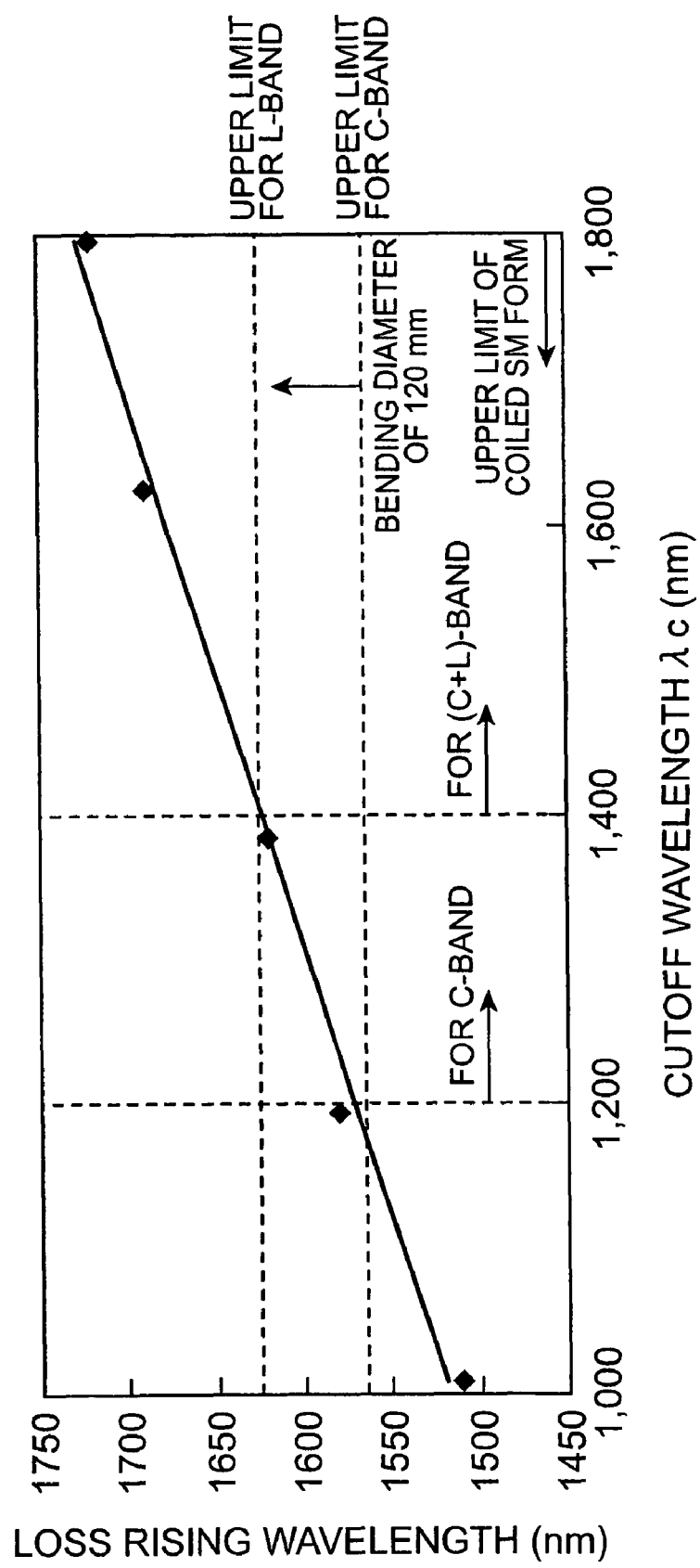
FIG. 8 is a graph showing a relation between bending loss rise wavelength and cutoff wavelength $\lambda c$ in an optical fiber according to the present invention.

FIG. 8 is a graph showing a relation between bending loss rise wavelength and cutoff wavelength λc, in the optical fiber 6 according to the present invention. In this measurement, the optical fiber 6 was bent in the diameter of 120 mm. When the optical fiber 6 is bent, a bending loss increases in a wavelength range longer than a certain wavelength (bending loss rise wavelength). As seen from this graph, the bending loss rise wavelength becomes longer as the cutoff wavelength λc becomes longer. In transmission of signal light in the C-band, when the cutoff wavelength λc is 1.2 μm or more, the bending loss rise wavelength is longer than the upper bound of the C-band, and influence of bending appears little. On the other hand, in the case of transmission of signal light in a wavelength range including the C-band and L-band, when the cutoff wavelength λc is 1.4 μm or more, the bending loss rise wavelength is longer than the upper bound of the L-band and influence of bending appears little.

Figure 9:
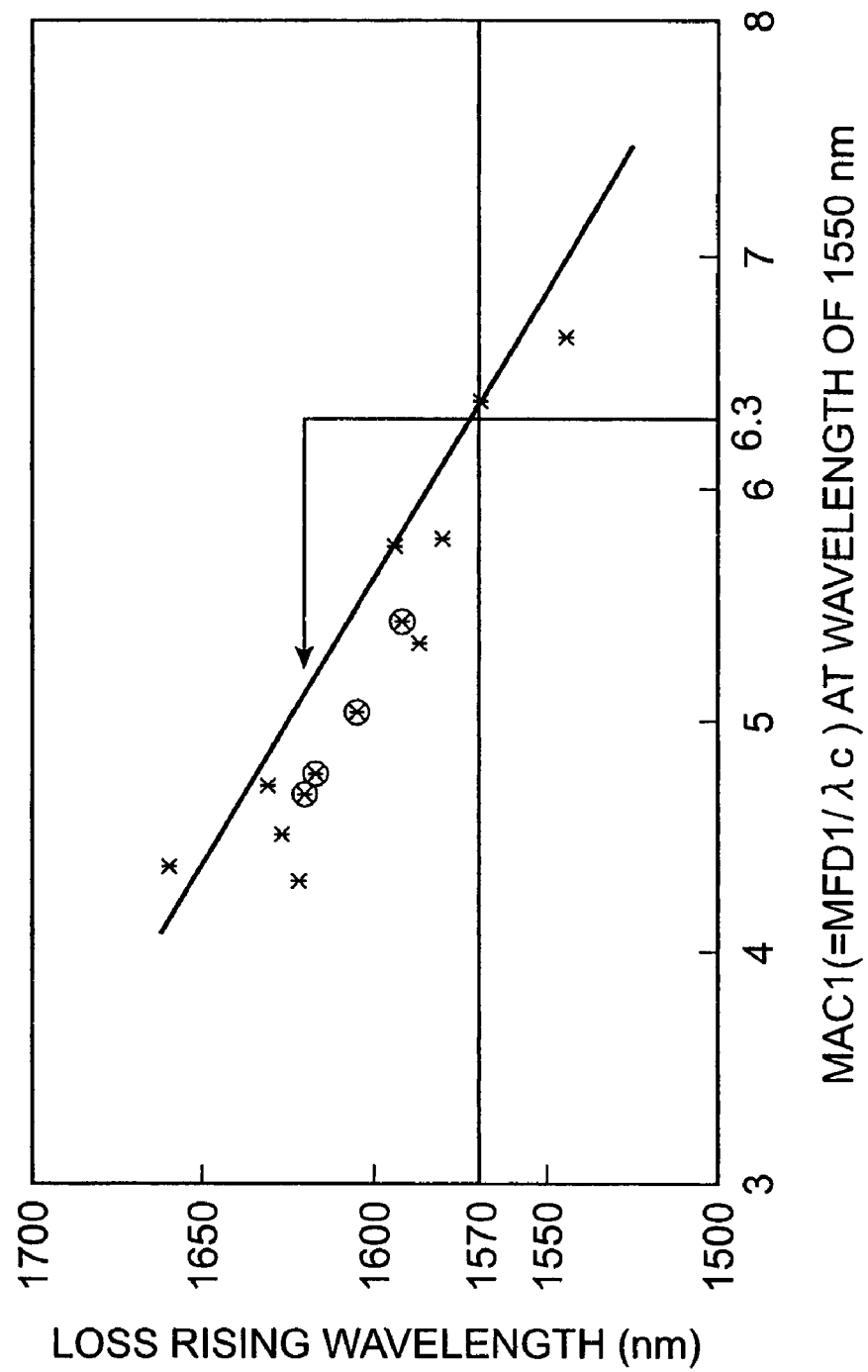
FIG. 9 is a graph for explaining a relation between bending loss rise wavelength (nm) and MAC1 (=MFD1/$\lambda$c) at the wavelength of 1550 nm.

The MAC value given by MFD/λc is often used as a parameter indicating micro bending loss resistance of optical fiber. When an optical fiber is wound in a coil form and then modularized, there is a correlation between "MAC1" resulting from division of the Petermann-I mode field diameter (MFD1) by the cutoff wavelength λc, and rise wavelength of module transmission loss. FIG. 9 is a graph for explaining a relation between MAC1 at the wavelength of 1550 nm and loss rise wavelength. Plots in FIG. 9 indicate module samples wound in a coil form in the diameter of 120 mm, and, particularly, those indicated by marks "○" are module samples to which Samples 1-4 of optical fibers according to the present invention are applied. As also be seen from FIG. 9, no loss rise is observed at wavelengths of 1570 nm or less in the cases of module samples wound in the coil form in the diameter of 120 mm, in the range where the MAC1 was 6.3 or less.

Figure 10:
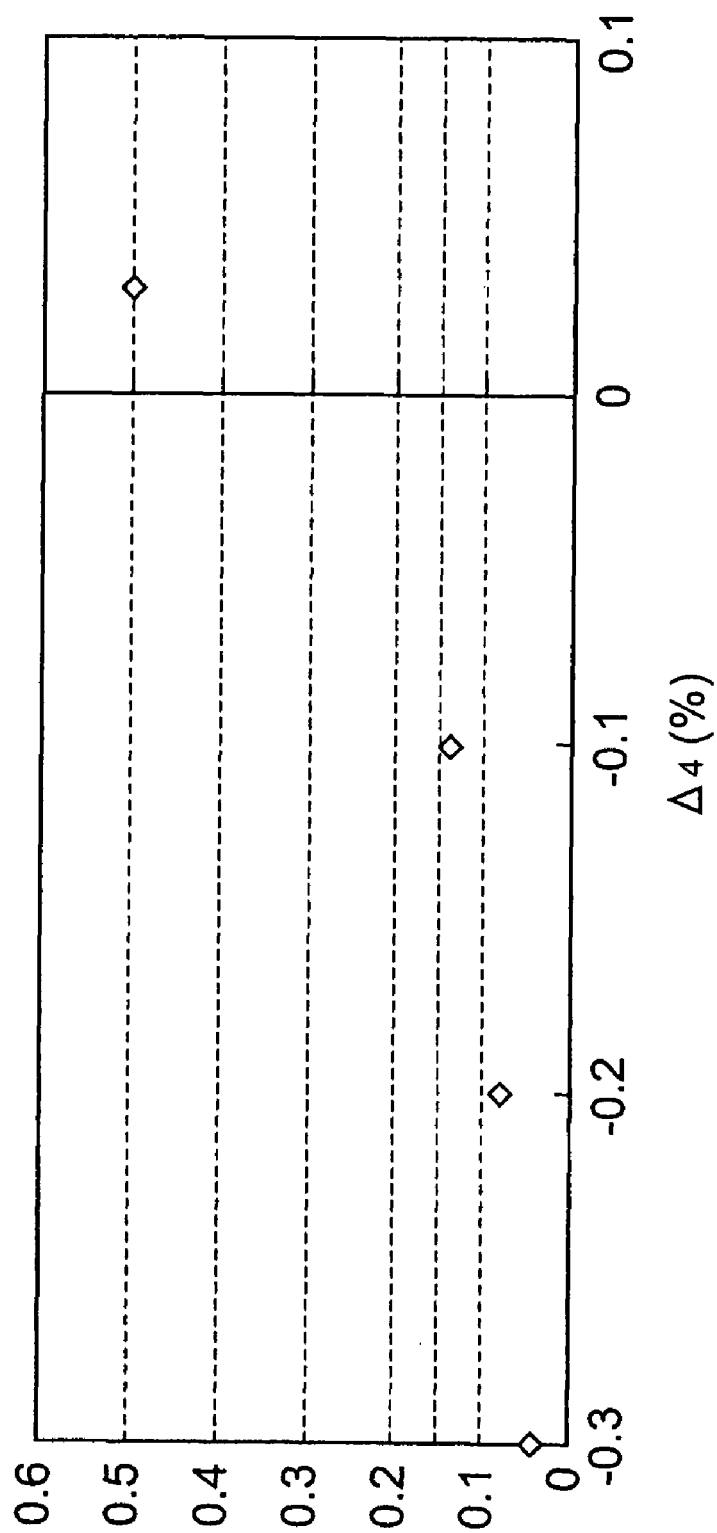
FIG. 10 is a graph showing a relation between loss increase after a hydrogen loading and relative refractive index difference $\Delta_4$ of the cladding region (relative refractive index difference of the cladding region as compared with pure silica glass) in optical fibers according to the present invention.

FIG. 10 is a graph showing a relation between loss increase amount after a hydrogen loading and relative refractive index difference $\Delta_4$ of the cladding region 64, as to optical fibers 6 according to the present invention. FIG. 10 also shows as a comparative example, an optical fiber in which the cladding region is not doped with F and in which the relative refractive index difference $\Delta_4$ is positive. Loss increase amounts after the hydrogen loading are those at the wavelength of 1380 nm. As seen from this graph, when compared with the optical fiber (comparative example) in which the cladding region is not doped with F and in which the relative refractive index difference $\Delta_4$ is positive, the optical fibers 6 in which the cladding region 64 is doped with F have lower loss because the drawing temperature is approximately 150° C. lower and the fictive temperature is lowered. A variation of loss in the 1380 nm wavelength band with respect to an exposure to a hydrogen atmosphere ($H_2$ 100%, 80° C., 1 atmosphere pressure) for 20 hours is preferably 0.15 dB/km or less.

Figure 11:
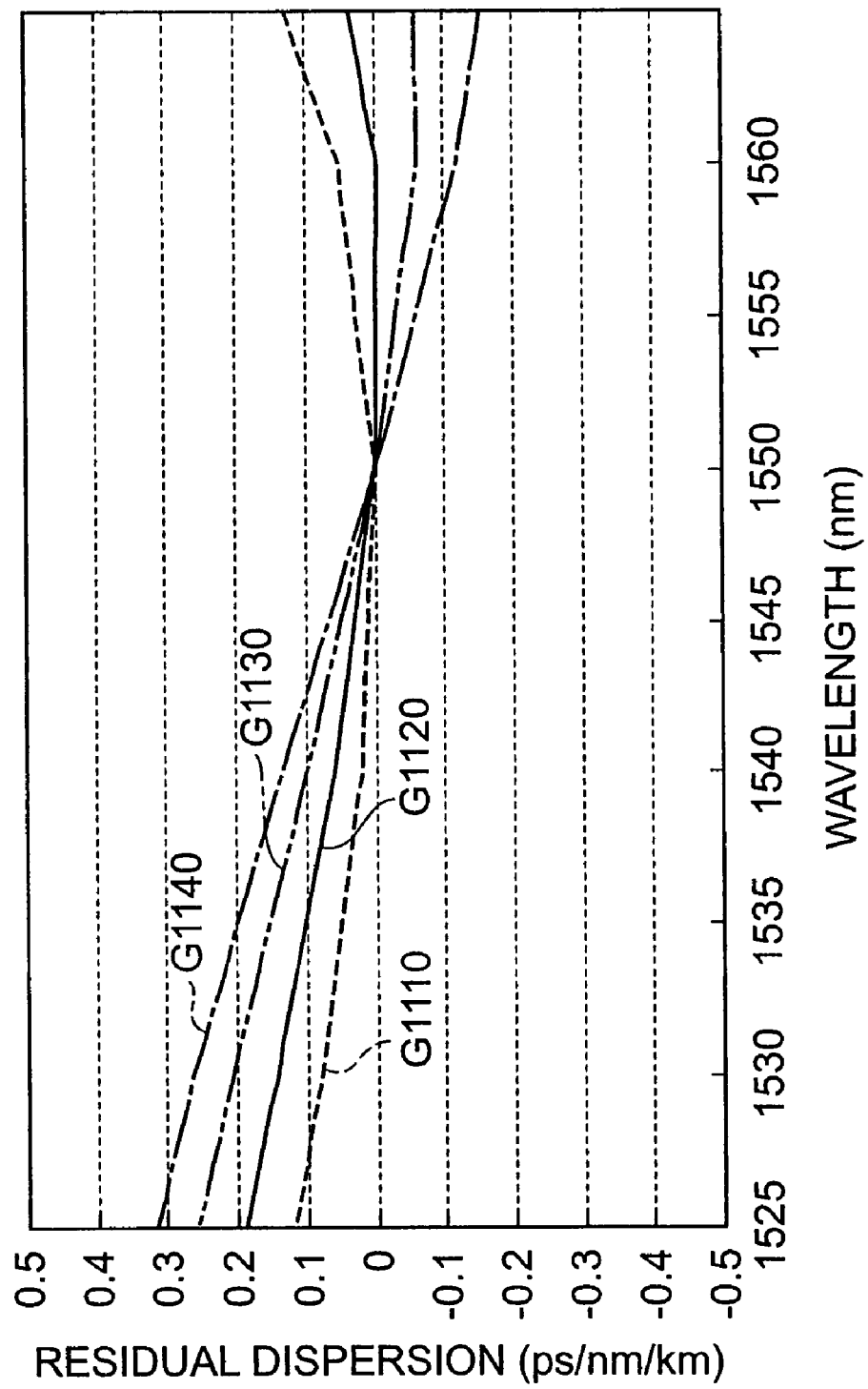
FIG. 11 is a graph showing wavelength dependence characteristics of residual dispersion in the C-band in cases where an optical fiber according to the present invention is connected to an SMF at various dispersion slope compensation rates (DSCR) (at the wavelength of 1550 nm)
Figure 12:
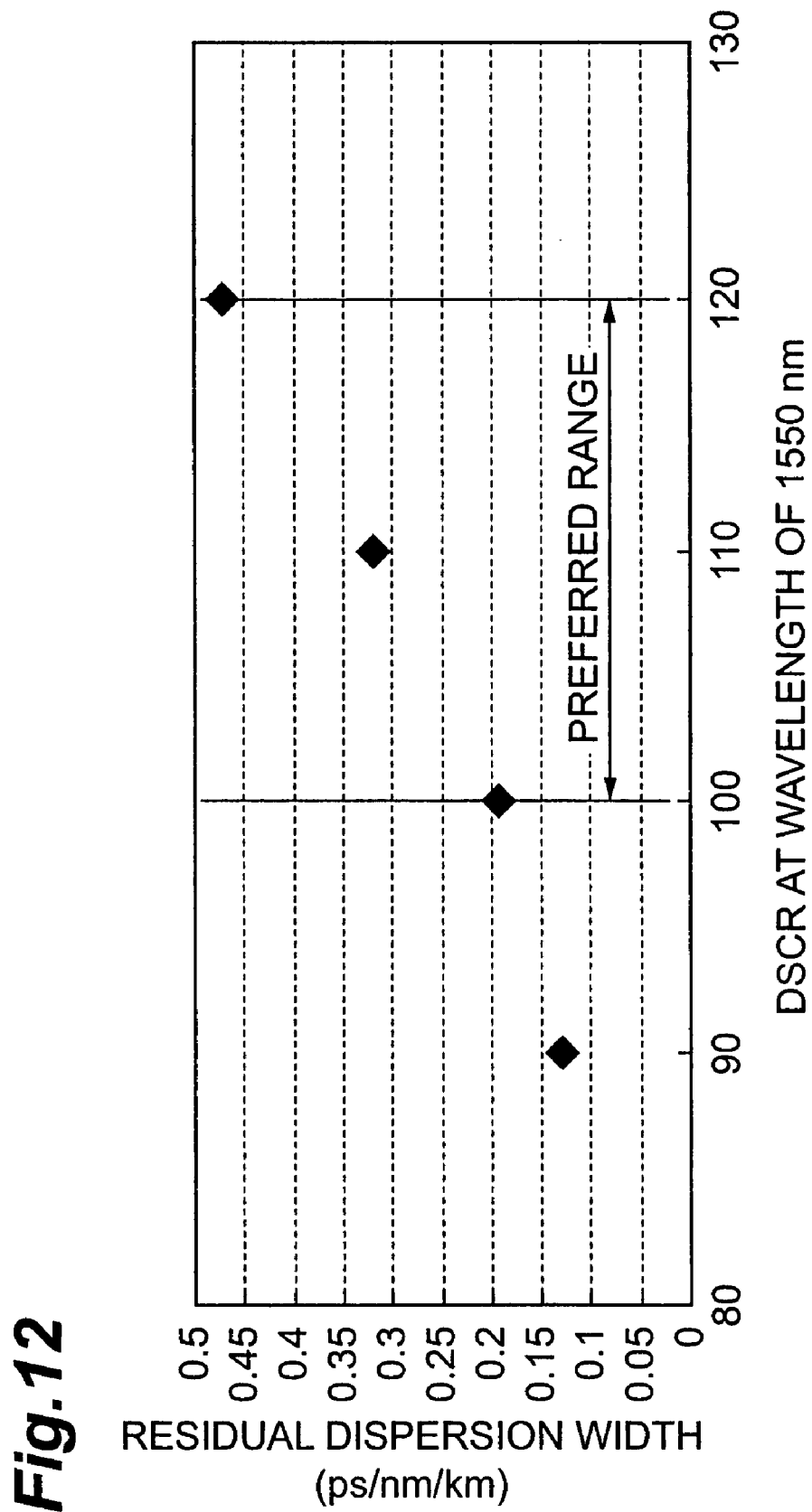
FIG. 12 is a graph showing a relation between DSCR (at the wavelength of 1550 nm) and residual dispersion in cases where an optical fiber according to the present invention is spliced to an SMF.
Figure 13:
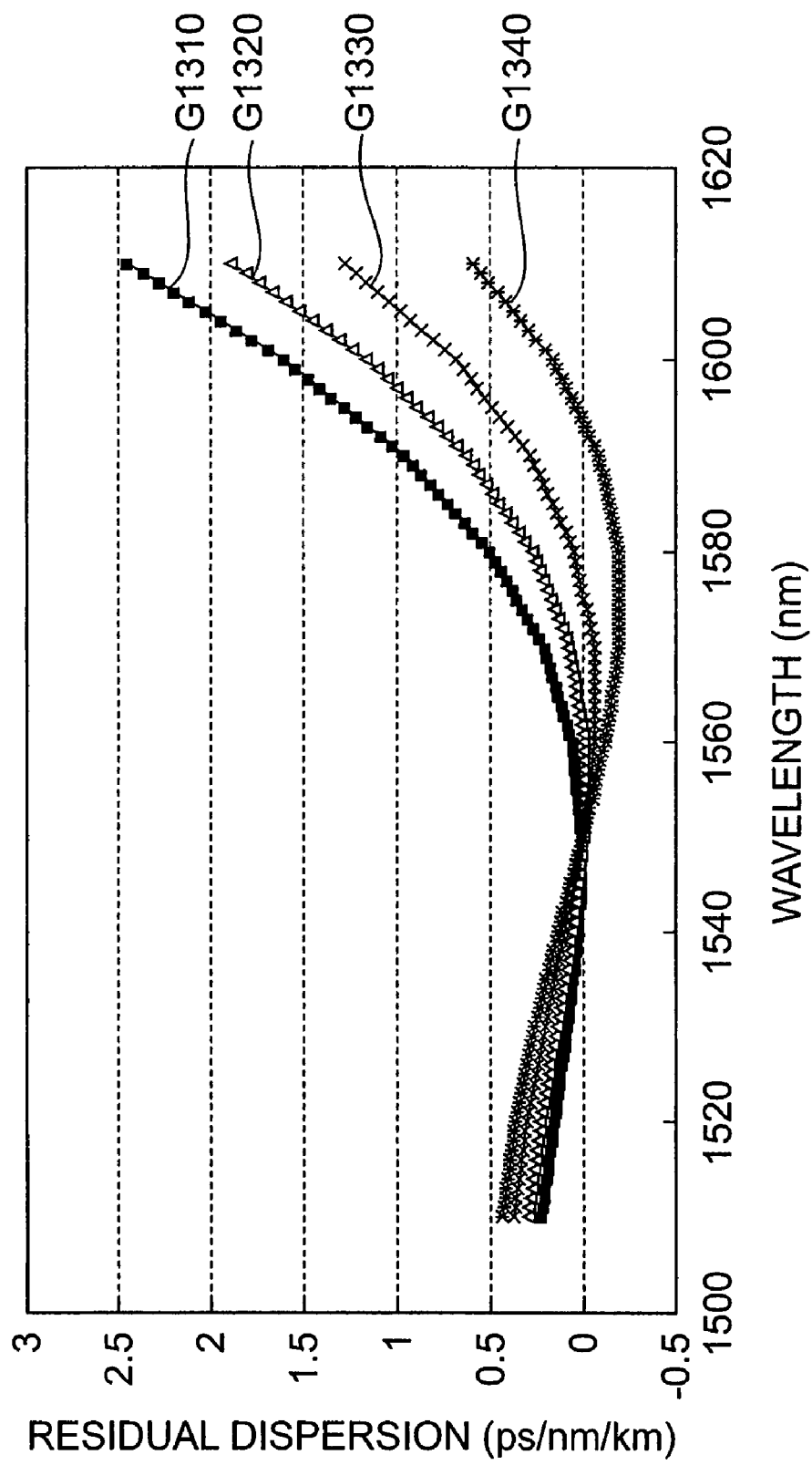
FIG. 13 is a graph showing wavelength characteristics of residual dispersion in a wavelength range including the C-band and L-band in cases where an optical fiber according to the present invention is connected to an SMF at various DSCRs.

FIG. 11 is a graph showing wavelength characteristics of residual dispersion in the C-band in cases where the optical fiber 6 according to the present invention is connected to the SMF 5 at various DSCRs (dispersion slope compensation rates at the wavelength of 1550 nm). In this graph, the ratio of lengths of optical fiber 6 and SMF 5 is adjusted so that the residual dispersion at the wavelength of 1550 nm becomes 0. In FIG. 11, graph G1110 indicates a residual dispersion spectrum of an optical transmission line in which the DSCR is set at 90%, graph G1120 a residual dispersion spectrum of an optical transmission line in which the DSCR is set at 100%, graph G1130 a residual dispersion spectrum of an optical transmission line in which the DSCR is set at 110%, and graph G1140 a residual dispersion spectrum of an optical transmission line in which the DSCR is set at 120%. FIG. 12 is a graph showing a relation between DSCR (at wavelength of 1550 nm) and residual dispersion width in the cases where the optical fiber 6 according to the present invention is connected to the SMF 5. The residual dispersion width stated herein is a width resulting from subtraction of a minimum from a maximum of residual dispersion amount in the C-band. The DSCR at the wavelength of 1550 nm is preferably in the range of 110±10%. FIG. 13 is a graph showing wavelength characteristics of residual dispersion in a wavelength range including the C-band and L-band, in the cases where the optical fiber 6 according to the present invention is connected to the SMF 5 at various DSCRs (at the wavelength of 1550 nm). In this graph, the ratio of lengths of optical fiber 6 and SMF 5 is also adjusted so that the residual dispersion at the wavelength of 1550 nm becomes 0. In FIG. 13, graph G1310 indicates a residual dispersion spectrum of an optical transmission line in which the DSCR is set at 90%, graph G1320 a residual dispersion spectrum of an optical transmission line in which the DSCR is set at 100%, graph G1330 a residual dispersion spectrum of an optical transmission line in which the DSCR is set at 110%, and graph G1340 a residual dispersion spectrum of an optical transmission line in which the DSCR is set at 120%. In each optical fiber 6 applied to the dispersion compensator, the wavelength dependence of residual chromatic dispersion has a downwardly convex shape in a wavelength band near the wavelength of 1550 nm.

Figure 14:
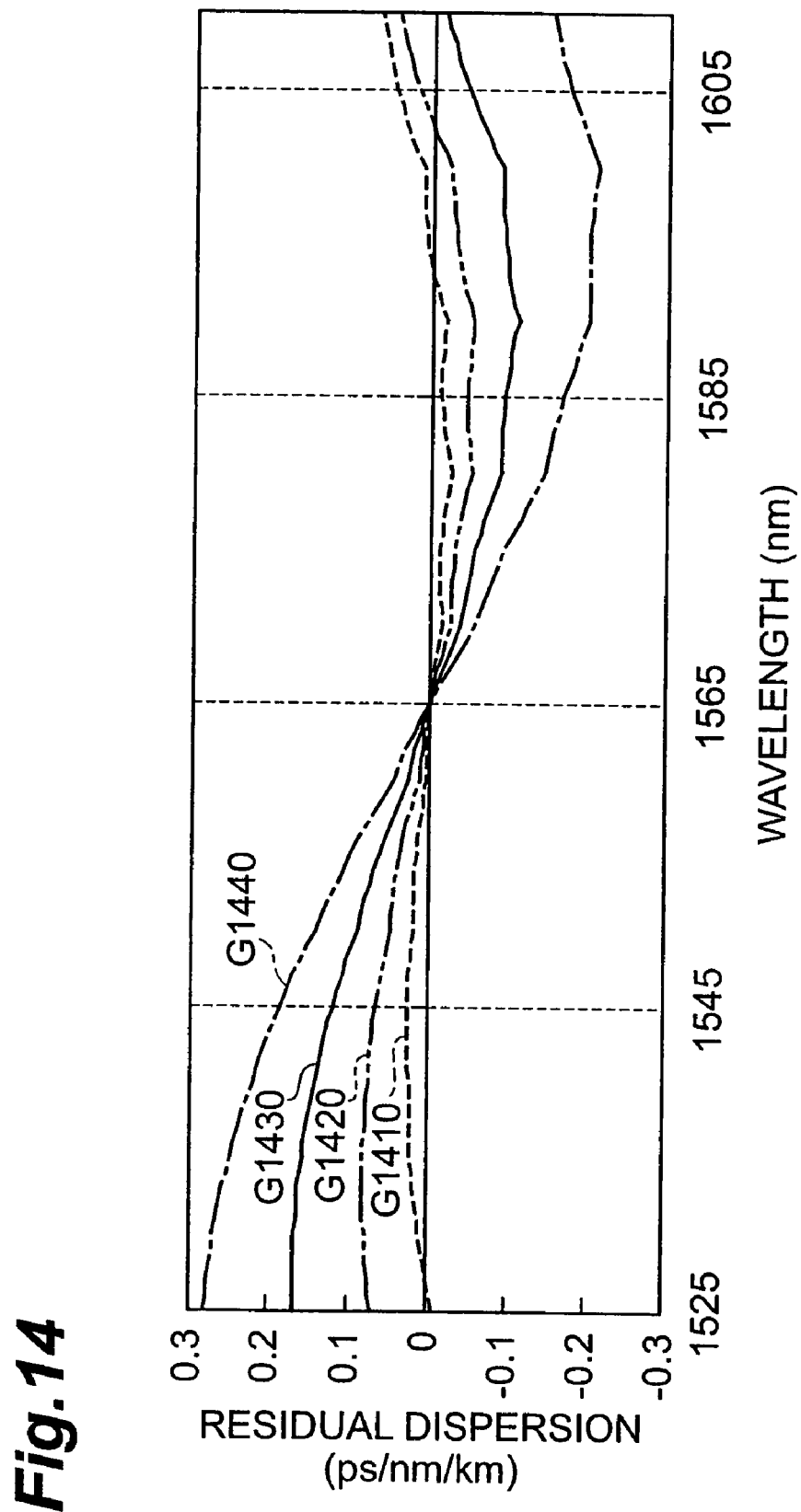
FIG. 14 is a graph showing chromatic dispersion characteristics of optical transmission lines in optical transmission systems according to the present invention.
Figure 16:
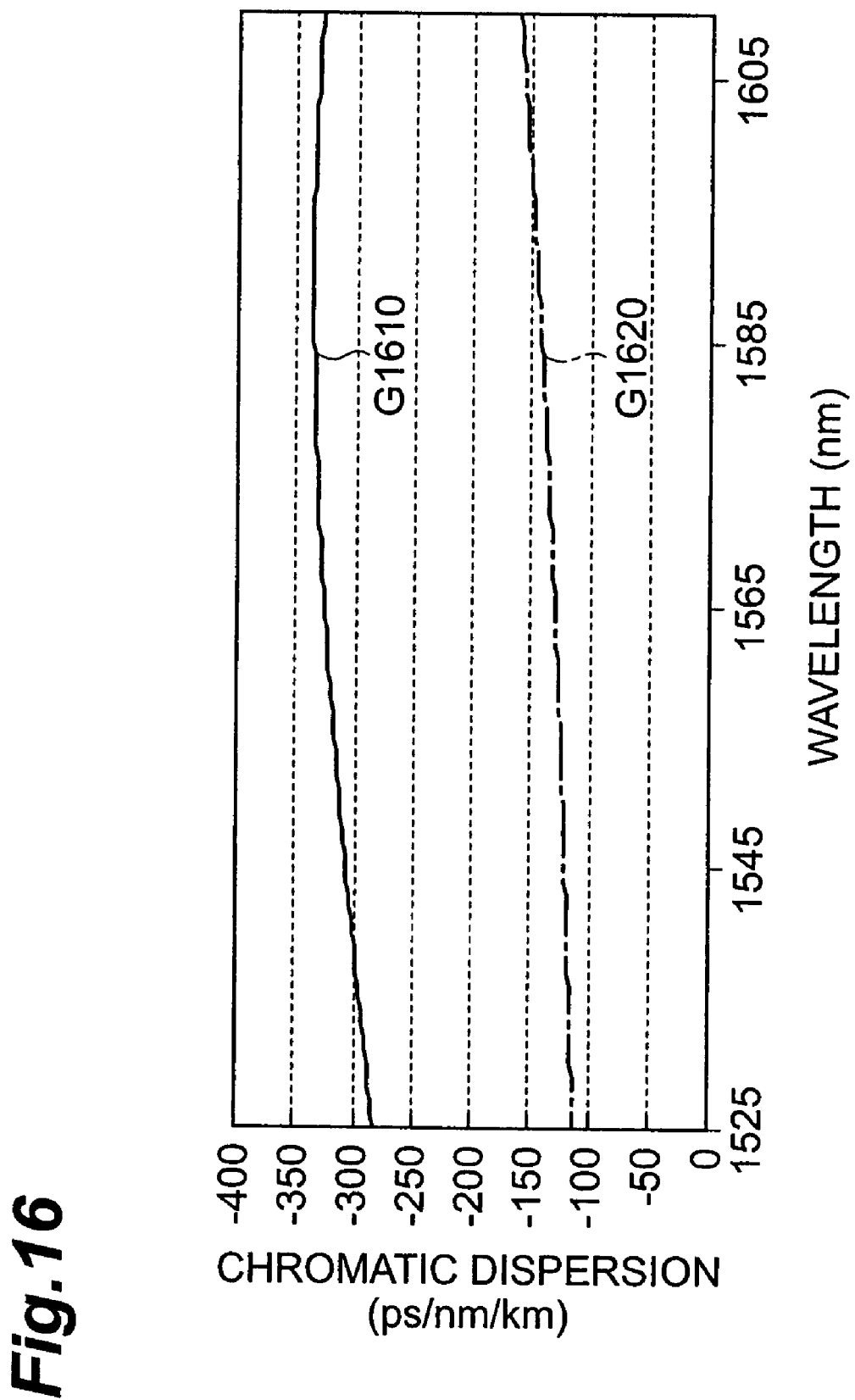
FIG. 16 is a graph showing chromatic dispersion characteristics of an optical fiber and another optical fiber according to the present invention.

FIG. 14 is a graph showing chromatic dispersion characteristics of optical transmission lines 4b in optical transmission systems 1b. In this graph, the length of SMF 5 is 100 km, and the ratio of lengths of the respective optical fibers 6, 7 is adjusted so that the residual dispersion at the wavelength of 1565 nm becomes 0. In FIG. 14, graph G1410 indicates a residual dispersion spectrum of an optical transmission line 4b in which the DSCR at the wavelength of 1565 nm is set at 90%, graph G1420 a residual dispersion spectrum of an optical transmission line 4b in which the DSCR at the wavelength of 1565 nm is set at 100%, graph G1430 a residual dispersion spectrum of an optical transmission line 4b in which the DSCR at the wavelength of 1565 nm is set at 110%, and graph G1440 a residual dispersion spectrum of an optical transmission line 4b in which the DSCR at the wavelength of 1565 nm is set at 120%. FIG. 15 is a table showing a list of residual dispersion values in cases where each of the optical fiber 6 and the optical fiber 7 according to the present invention is connected to the SMF 5. FIG. 16 is a graph showing chromatic dispersion characteristics of the optical fiber 6 and the optical fiber 7 according to the present invention. In FIG. 16, graph G1610 indicates a chromatic dispersion characteristic of the optical fiber 6, and graph G1620 a chromatic dispersion characteristic of the optical fiber 7. In the optical transmission line in which the optical fiber 6 according to the present invention is spliced to the SMF 5 having the above-described characteristics, the wavelength dependence of residual dispersion spectrum in the 1.55 µm wavelength band in the optical transmission line after being compensated for total dispersion at the wavelength of 1565 nm has a downwardly convex shape. In the optical transmission line in which the optical fiber 7 is connected to the SMF 5, the wavelength dependence of chromatic dispersion characteristic in the 1.55 µm wavelength band in the optical transmission line after being compensated for total dispersion at the wavelength of 1565 nm has an upwardly convex shape. In the optical transmission line 4b in which the SMF 5, optical fiber 6, and optical fiber 7 are connected in cascade, the wavelength dependences of residual dispersion spectra in the 1.55 µm wavelength band can be compensated by adjusting the lengths of the dispersion compensating fibers shown in FIGS. 6A and 6B so as to decrease the residual dispersion in the C+L band while adjusting the total dispersion amount. As a result, compensation can be achieved by the dispersion compensating fibers with an average unit dispersion larger than before over a wide wavelength range. For example, the optical fiber 6 with the DSCR of 90% and the optical fiber 7 with the DSCR of 107% are applied as dispersion compensators for the optical transmission line 4b, and the fiber lengths of the respective fibers are adjusted, for example, to the fiber lengths at DSCR=90% in FIG. 15; then the residual dispersion can be kept at a very small value, 0.039 ps/nm/km, over a broad band from 1550 nm to 1610 nm.

Figure 17:
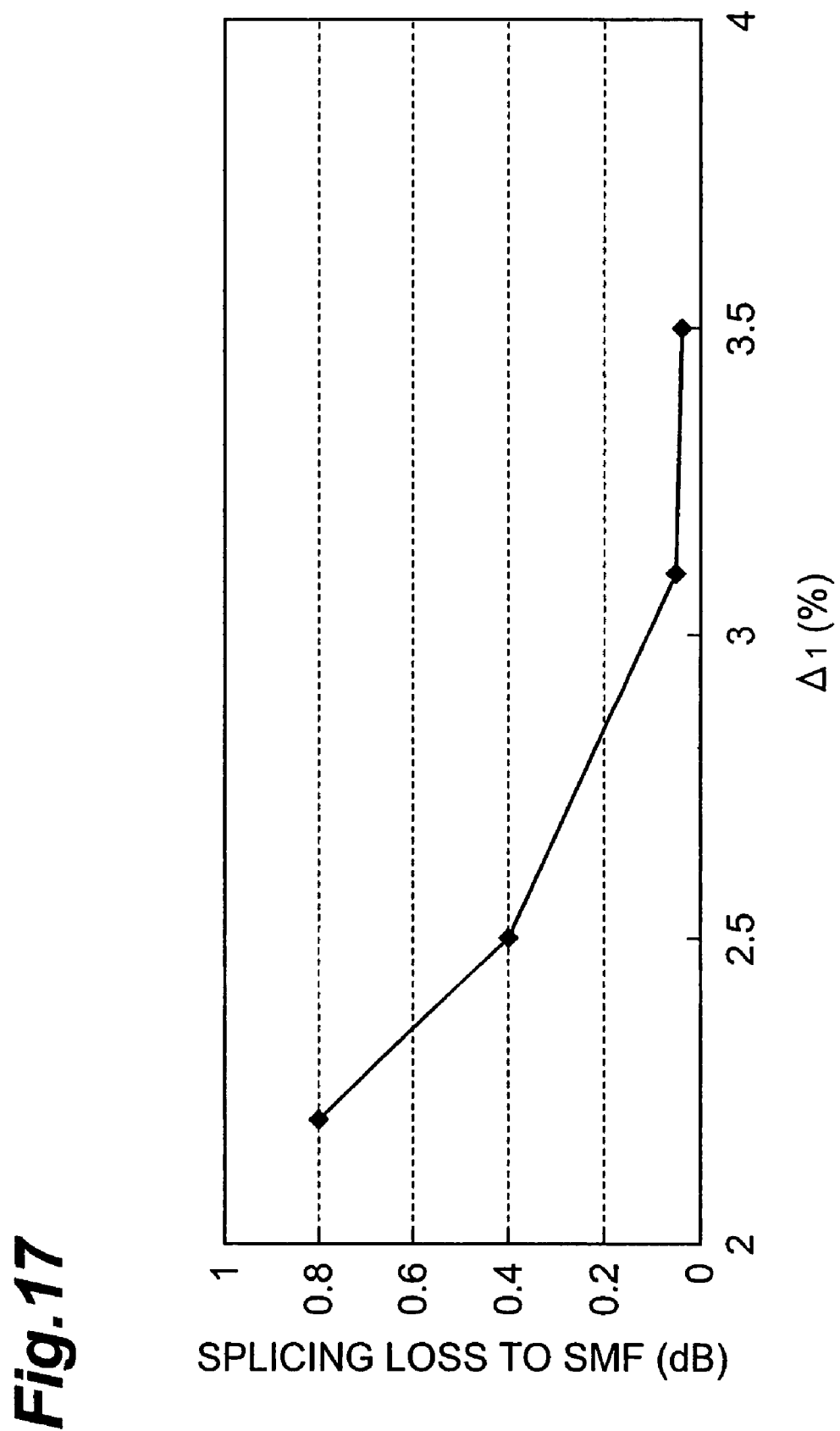
FIG. 17 is a graph showing a relation between splicing loss in fusion splice of an optical fiber according to the present invention to a SMF and relative refractive index difference $\Delta_1$ of the core region of the optical fiber (relative refractive index difference of the core region as compared with pure silica glass)

FIG. 17 is a graph showing a relation between splicing loss and relative refractive index difference $\Delta_1$ of the core region 61 in optical fiber 6, as to optical transmission lines 4a in each of which the optical fiber 6 according to the present invention is fusion-spliced to the SMF 5. As the relative refractive index difference $\Delta_1$ of the core region 61 in the optical fiber 6 increases, a power distribution of guided light propagating in the optical fiber 6 becomes similar to a power distribution of Gaussian shape of guided light propagating in the SMF 5, and thus the splicing loss becomes lower between the optical fiber 6 and the SMF 5. The splicing loss can be readily reduced by heating a certain range including a fusion-spliced point to make the Ge dopant diffused.

FIG. 18 is a table showing a list of characteristics of optical fiber 6 in a case where the optical fiber 6 according to the present invention is modularized as a dispersion compensator. The table in FIG. 18 also includes characteristics of an optical fiber of Comparative Example 2 (cf. Non-patent Document 1), along with Sample 1 (cf. FIG. 6A) as the optical fiber 6. When compared with the optical fiber of Comparative Example 2, the optical fiber of Sample 1 has approximately half module loss. Since the optical fiber of Sample 1 has the cutoff wavelength λc of 1.55 µm and the mode field diameter of 4.19 µm, the bending loss thereof is small. For this reason, the module loss estimated from the loss of the module itself and splicing loss is approximately coincident with the transmission loss. The outside diameter of the optical fiber 6 of Sample 1 is preferably 100 µm or more but 130 µm or less. By realizing the dispersion adjustment and inexpensive dispersion compensating fiber (by decreasing the volume of the cladding region), a fiber length per unit weight of preform can be increased.

Figure 20:
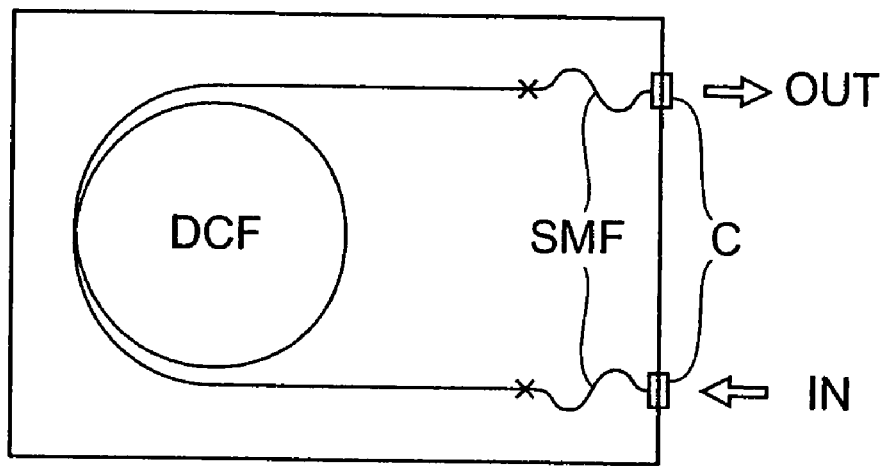
FIG. 20 is a plan view showing a configuration of a dispersion compensation module prepared for acquiring the various characteristics shown in FIG. 19.

FIG. 19 is a table showing a list of characteristics of respective dispersion compensation modules in which each of samples (Sample 1 and Sample 2) of optical fibers 6 according to the present invention, or Comparative Example 3 is applied. This measurement is carried out in a dispersion compensation module shown in FIG. 20. Namely, each of the optical fibers of Samples 1, 2, and an optical fiber of Comparative Example 3 as measured objects is housed as a dispersion compensating fiber (DCF) in a state in which SMFs are fusion-spliced to its both ends, in a housing. The dispersion compensation module shown in FIG. 20 is provided with connectors C as optical input/output terminals.

In the table of FIG. 19, $N_2$ represents a nonlinear refractive index, $A_{eff}$ represents an effective area, $L_{eff}$ represents an effective fiber length, and φSPM represents a phase shift amount due to self-phase modulation. When compared with the optical fiber of Comparative Example 3, the optical fibers of Samples 1, 2 have larger nonlinear coefficients ($N_2/A_{eff}$) and thus seem to have inferior nonlinearity, but the length needed for dispersion compensation becomes shorter because of the large absolute value of chromatic dispersion; therefore, the phase shift amount φSPM due to self-phase' modulation can be suppressed overall.

Since in the optical fiber 6 of the present invention the cladding region 64 is doped with F, the cladding region 64 serves as an antiguide structure to an acoustic mode. Namely, acoustic wave is not transmitted along the fiber, and thus interference is reduced with optical waves, thus also achieving an effect of increasing a threshold of stimulated Brillouin scattering.

Next, FIGS. 21A and 21B show characteristics of Sample 3 having the ratio Rb (=2b/2c) of the outside diameter 2b of the depressed region 62 to the outside diameter 2c of the ring region 63 over 0.75 (0.55≦Rb≦0.85), and characteristics of Sample 4 with the ratio Rb relatively low, as optical fibers 6 according to the present invention. These optical fibers of Samples 3, 4 also achieve effects similar to those of the optical fibers of Samples 1 and 2 described above.

As shown in FIGS. 21A and 21B, the optical fibers of Samples 3, 4 are optical fibers with the small core diameter of 1.87 μm or 1.92 μm. In the optical fiber of Sample 3, the ratio Ra is 0.232 and the ratio Rb is 0.781 and, as compared with pure silica glass, the relative refractive index difference $\Delta_1$ of the core region 61 is 3.2%, the relative refractive index difference $\Delta_2$ of the depressed region 62 is −0.7%, the relative refractive index difference $\Delta_3$ of the ring region 63 is 0.21%, and the relative refractive index difference $\Delta_4$ of the cladding region 64 is −0.2%. At this time, the optical fiber of Sample 3 has the chromatic dispersion of −282.5 ps/nm/km at the wavelength of 1550 nm, the dispersion slope of −0.98 ps/nm$^2$/km at the wavelength of 1550 nm, the DSCR of 100.2 for the SMF 5, the transmission loss of 0.95 dB/km at the wavelength of 1550 nm, the cutoff wavelength λc of 1.36 μm in the fiber length of 2 m, and the FOM of 297.4 ps/nm/dB. The optical fiber of Sample 3 has the MFD1 of 6.88 μm and the MAC1 of 5.05.

On the other hand, in the optical fiber of Sample 4, the ratio Ra is 0.24, and the ratio Rb is 0.637, and, as compared with pure silica glass, the relative refractive index difference $\Delta_1$ of the core region 61 is 3.07%, the relative refractive index difference $\Delta_2$ of the depressed region 62 is −0.7%, the relative refractive index difference $\Delta_3$ of the ring region 63 is 0.04%, and the relative refractive index difference $\Delta_4$ of the cladding region 64 is −0.2%. At this time, the optical fiber of Sample 4 has the chromatic dispersion of −298.5 ps/nm/km at the wavelength of 1550 nm, the dispersion slope of −1.0445 ps/nm$^2$/km at the wavelength of 1550 nm, the DSCR of 102.5 for the SMF 5, the transmission loss of 0.84 dB/km at the wavelength of 1550 nm, the cutoff wavelength λc of 1.49 μm in the fiber length of 2 m, and the FOM of 355.4 ps/nm/dB. The optical fiber of Sample 4 has the MFD1 of 7.15 μm and MAC1 of 4.80.

As described above, the optical fibers of Samples 3 and 4 achieve the FOMs larger than before.

Furthermore, FIGS. 22A to 23B show characteristics of Samples 5 to 9 in which a relative refractive index difference of the core region falls within the lower part range of greater than 2% but less than 3%. These optical fibers of Samples 5 to 9 also achieve effects similar to those of the optical fibers of Samples 1 and 2 described above.

As shown in FIG. 22A, in the optical fiber of Sample 5, the ratio Ra is 0.248 and the ratio Rb is 0.68 and, as compared with pure silica glass, the relative refractive index difference $\Delta_1$ of the core region 61 is 2.91%, the relative refractive index difference $\Delta_2$ of the depressed region 62 is −0.72%, the relative refractive index difference $\Delta_3$ of the ring region 63 is 0.17%, and the relative refractive index difference $\Delta_4$ of the cladding region 64 is −0.18%. The diameter of the core region 61 is 2.02 μm. At this time, the optical fiber of Sample 5 has the cutoff wavelength λc of 1550 nm in the fiber length of 2 m, the chromatic dispersion of −274 ps/nm/km at the wavelength of 1550 nm, the DSCR of 98 for the SMF 5 at the wavelength of 1550 nm, the effective area $A_{eff}$ of 14 μm$^2$ at the wavelength 0f 1550 nm, the residual dispersion of ±0.12 ps/nm/km in the range from 1530 to 1565 nm, the FOM of 360 ps/nm/dB at the wavelength of 1550 nm, and the bending loss of 1.2 dB/m at the wavelength when being bent in the diameter of 20 mm. The optical fiber of Sample 5 has the MFD1 of 7.5 μm and the MAC1 of 4.84.

As shown in FIG. 22B, in the optical fiber of Sample 6, the ratio Ra is 0.22 and the ratio Rb is 0.78 and, as compared with pure silica glass, the relative refractive index difference $\Delta_1$ of the core region 61 is 2.76%, the relative refractive index difference $\Delta_2$ of the depressed region 62 is −0.77%, the relative refractive index difference $\Delta_3$ of the ring region 63 is 0.17%, and the relative refractive index difference $\Delta_4$ of the cladding region 64 is −0.29%. The diameter of the core region 61 is 2.01 μm. At this time, the optical fiber of Sample 6 has the cutoff wavelength λc of 1420 nm in the fiber length of 2 m, the chromatic dispersion of −255 ps/nm/km at the wavelength of 1550 nm, the DSCR of 115 for the SMF 5 at the wavelength of 1550 nm, the effective area $A_{eff}$ of 14 μm$^2$ at the wavelength Of 1550 nm, the residual dispersion of ±0.18 ps/nm/km in the range from 1530 to 1565 nm, the FOM of 280 ps/nm/dB at the wavelength of 1550 nm, and the bending loss of 5.1 dB/m at the wavelength when being bent in the diameter of 20 mm. The optical fiber of Sample 5 has the MFD1 of 7.7 μm and the MAC1 of 5.42.

As shown in FIG. 22C, in the optical fiber of Sample 7, the ratio Ra is 0.255 and the ratio Rb is 0.71 and, as compared with pure silica glass, the relative refractive index difference $\Delta_1$ of the core region 61 is 2.54%, the relative refractive index difference $\Delta_2$ of the depressed region 62 is −0.72%, the relative refractive index difference $\Delta_3$ of the ring region 63 is 0.21%, and the relative refractive index difference $\Delta_4$ of the cladding region 64 is −0.2%. The diameter of the core region 61 is 2.19 μm (about 2.2 μm). At this time, the optical fiber of Sample 7 has the cutoff wavelength λc of 1610 nm in the fiber length of 2 m, the chromatic dispersion of −242 ps/nm/km at the wavelength of 1550 nm, the DSCR of 102 for the SMF 5 at the wavelength of 1550 nm, the effective area $A_{eff}$ of 16 μm$^2$ at the wavelength of 1550 nm, the residual dispersion of ±0.10 ps/nm/km in the range from 1530 to 1565 nm, the FOM of 345 ps/nm/dB at the wavelength of 1550 nm, and the bending loss of 9.5 dB/m at the wavelength when being bent in the diameter of 20 mm. The optical fiber of Sample 5 has the MFD1 of 7.9 μm and the MAC1 of 4.91.

As shown in FIG. 23A, in the optical fiber of Sample 8, the ratio Ra is 0.275 and the ratio Rb is 0.71 and, as compared with pure silica glass, the relative refractive index difference $\Delta_1$ of the core region 61 is 2.25%, the relative refractive index difference $\Delta_2$ of the depressed region 62 is −0.76%, the relative refractive index difference $\Delta_3$ of the ring region 63 is 0.20%, and the relative refractive index difference $\Delta_4$ of the cladding region 64 is −0.22%. The diameter of the core region 61 is 2.40 μm. At this time, the optical fiber of Sample 8 has the cutoff wavelength λc of 1720 nm in the fiber length of 2 m, the chromatic dispersion of −218 ps/nm/km at the wavelength of 1550 nm, the DSCR of 112 for the SMF 5 at the wavelength of 1550 nm, the effective area $A_{eff}$ of 14 μm$^2$ at the wavelength 0f 1550 nm, the residual dispersion of ±0.16 ps/nm/km in the range from 1530 to 1565 nm, the FOM of 401 ps/nm/dB at the wavelength of 1550 nm, and the bending loss of 8.5 dB/m at the wavelength when being bent in the diameter of 20 mm. The optical fiber of Sample 5 has the MFD1 of 7.9 μm and the MAC1 of 4.59.

As shown in FIG. 23B, in the optical fiber of Sample 9, the ratio Ra is 0.33 and the ratio Rb is 0.65 and, as compared with pure silica glass, the relative refractive index difference $\Delta_1$ of the core region 61 is 2.05%, the relative refractive index difference $\Delta_2$ of the depressed region 62 is −0.76%, the relative refractive index difference $\Delta_3$ of the ring region 63 is 0.20%, and the relative refractive index difference $A_4$ of the cladding region 64 is −0.12%. The diameter of the core region 61 is 2.66 μm. At this time, the optical fiber of Sample 9 has the cutoff wavelength λc of 1620 nm in the fiber length of 2 m, the chromatic dispersion of −195 ps/nm/km at the wavelength of 1550 nm, the DSCR of 90 for the SMF 5 at the wavelength of 1550 nm, the effective area $A_{eff}$ of 17 μm$^2$ at the wavelength 0f 1550 nm, the residual dispersion of ±0.14 ps/nm/km in the range from 1530 to 1565 nm, the FOM of 340 ps/nm/dB at the wavelength of 1550 nm, and the bending loss of 3 dB/m at the wavelength when being bent in the diameter of 20 mm. The optical fiber of Sample 5 has the MFD1 of 7.9 μm and the MAC1 of 4.88.

As described above, the optical fibers of Samples 5 to 9, in which a relative refractive index difference of the core region falls within the lower part range of greater 2% but less than 3%, more preferably 2.2% or more but less than 3%, achieve the FOMs larger than before.

The optical fibers according to the present invention further increase the FOM and effectively compensate for chromatic dispersion of SMF.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber mainly composed of silica glass, said optical fiber comprising a core region extending along a designated axis, a depressed region provided on an outer periphery of said core region, a ring region provided on an outer periphery of said depressed region, and a cladding region provided on an outer periphery of said ring region and doped with F,
   wherein as compared with a refractive index of pure silica glass, a relative refractive index difference of said core region is greater than 2% but less than 3%, a relative refractive index difference of said depressed region is −1% or more but −0.5% or less, a relative refractive index difference of said ring region is 0.01% or more but 0.24% or less, and a relative refractive index difference of said cladding region is −0.3% or more but −0.1% or less,
   wherein a ratio Ra (=2a/2b) of an outside diameter 2a of said core region to an outside diameter 2b of said depressed region is 0.15 or more but 0.35 or less and a ratio Rb (=2b/2c) of the outside diameter 2b of said depressed region to an outside diameter 2c of said ring region is 0.55 or more but 0.85 or less, and
   wherein the outside diameter 2a of said core region is 1.5 μm or more but 3.0 μm or less, and at a wavelength of 1550 nm an FOM (=|dispersion|/loss) is 250 ps/nm/dB or more.

2. An optical fiber according to claim 1, wherein the ratio Rb (=2b/2c) is 0.55 or more but 0.75 or less, and the outside diameter 2a of said core region is 1.5 μm or more but 2.5 μm or less.

3. An optical fiber according to claim 1, wherein said optical fiber has the following characteristics in the C-band: a chromatic dispersion of −150 ps/nm/km or less; an RDS (=S/D) of 0.002 nm$^{-1}$ or more but 0.01 nm$^{-1}$ or less, which is defined by a ratio of dispersion slope S to chromatic dispersion D; and a bending loss of 100 dB/m or less when being bent in a diameter of 20 mm, and wherein said optical fiber has a cutoff wavelength of 1.2 μm or more but 1.8 μm or less.

4. An optical fiber according to claim 1, wherein with respect to an exposure to a hydrogen atmosphere ($H_2$ 100%, 80° C., 1 atm pressure) for 20 hours, a variation of loss in a 1380 nm wavelength band is 0.3 dB/km or less.

5. An optical fiber according to claim 1, wherein when said optical fiber with a designated length is connected to a single mode fiber having the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less, a residual dispersion amount of an entire optical transmission line which is constituted by said single mode fiber and said optical fiber is 0.3 ps/nm/km or less in the C-band or in the L-band.

6. An optical fiber according to claim 1, wherein when said optical fiber with a designated length is connected to a single mode fiber having the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less, a residual dispersion amount of an entire optical transmission line which is constituted by said single mode fiber and said optical fiber is 0.5 ps/nm/km or less in a wavelength range including the C-band and the L-band.

7. An optical fiber according to claim 1, wherein said optical fiber further has a transmission loss of 0.5 dB/km or more but 1.0 dB/km or less at the wavelength of 1550 nm.

8. An optical fiber according to claim 1, wherein said optical fiber further has a polarization mode dispersion of 0.3 ps/km$^{1/2}$ or less at the wavelength of 1550 nm.

9. An optical fiber according to claim 1, wherein when said optical fiber with a designated length is connected to a single mode fiber having the following characteristics at the wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less, and
   wherein said optical fiber has a splicing loss of 0.30 dB or less at the wavelength of 1550 nm and a splicing loss of 0.25 dB or less at a wavelength of 1620 nm.

10. An optical fiber according to claim 1, wherein the refractive index difference of said core region is 2.2% or more but less than 3%.

11. An optical transmission line comprising:
   a single mode fiber having the following characteristics at a wavelength of 1550 nm: a chromatic dispersion of 12 ps/nm/km or more but 21 ps/nm/km or less; and a dispersion slope of 0.04 ps/nm$^2$/km or more but 0.10 ps/nm$^2$/km or less; and
   a first dispersion compensating fiber having the same structure as an optical fiber according to claim 1.

12. An optical transmission line according to claim 11, further comprising a second dispersion compensating fiber having a dispersion characteristics such that, in the C-band, a convex direction of a residual dispersion spectrum in a first line configuration which consists of said single mode fiber and said second dispersion compensating fiber is opposite to a convex direction of a residual dispersion spectrum in a second line configuration which consists of said single mode fiber and said first dispersion compensating fiber,
   wherein each of said first and second dispersion compensating fibers substantially compensates for total dispersion of said single mode fiber in a 1550 nm wavelength band when connected to said single mode fiber, and lengths of said first and second dispersion compensating fibers are adjusted so as to decrease a residual dispersion of said entire optical transmission line in a used wavelength band.

13. An optical transmission line according to claim 12, wherein the lengths of said first and second dispersion compensating fibers are adjusted so that a maximum residual dispersion amount in a wavelength range from 1550 nm to 1610 nm becomes 0.04 ps/nm/km.

14. An optical module including an optical fiber according to claim 1, which is modularized.

15. An optical transmission system comprising:
   an optical fiber transmission line in which signal light propagates; and
   an optical fiber according to claim 1, which compensates for chromatic dispersion of said optical fiber transmission line.

16. An optical fiber mainly composed of silica glass, said optical fiber comprising a core region extending along a designated axis, a depressed region provided on an outer periphery of said core region, a ring region provided on an outer periphery of said depressed region, and a cladding region provided on an outer periphery of said ring region and doped with F,
   wherein as compared with the refractive index of pure silica glass, a relative refractive index difference of said core region is greater than 2% but less than 3%, a relative refractive index difference of said depressed region is −1% or more but −0.5% or less, a relative refractive index difference of said ring region is 0.01% or more but 0.24% or less, and a relative refractive index difference of said cladding region is −0.3% or more but −0.1% or less,
   wherein a ratio Ra ($=2a/2b$) of an outside diameter $2a$ of said core region to an outside diameter $2b$ of said depressed region is 0.15 or more but 0.5 or less and a ratio Rb ($=2b/2c$) of the outside diameter $2b$ of said depressed region to an outside diameter $2c$ of said ring region is 0.55 or more but 0.85 or less,
   wherein the outside diameter $2a$ of said core region is 1.5 µm or more but 3.0 µm or less, and at a wavelength of 1550 nm an FOM (=|dispersion|/loss) is 250 ps/nm/dB or more,
   wherein said optical fiber has the following characteristics in the C-band: a chromatic dispersion of −150 ps/nm/km or less; an RDS (=S/D) of 0.002 $nm^{-1}$ or more but 0.01 $nm^{-1}$ or less, which is defined by a ratio of dispersion slope S to chromatic dispersion D; and a bending loss of 100 dB/m or less when being bent in a diameter of 20 mm,
   wherein said optical fiber has a cutoff wavelength of 1.2 µm or more but 1.8 µm or less,
   wherein said optical fiber has a polarization mode dispersion of 0.3 $ps/km^{1/2}$ or less at the wavelength of 1550 nm, and
   wherein when said optical fiber is fusion-spliced to a single mode fiber having the following characteristics at the wavelength of 1550 nm: a chromatic dispersion of 12 ps/nm/km or more but 21 ps/nm/km or less; and a dispersion slope of 0.04 $ps/nm^2/km$ or more but 0.10 $ps/nm^2/km$ or less, a splicing loss between said single mode fiber and said optical fiber at the wavelength of 1550 nm is 0.30 dB or less, and a splicing loss between said single mode fiber and said optical fiber at a wavelength of 1620 nm is 0.25 dB or less.

* * * * *